US012275242B2

(12) United States Patent
Walsh et al.

(10) Patent No.: US 12,275,242 B2
(45) Date of Patent: Apr. 15, 2025

(54) ACTUATOR COMPONENT FOR A DROPLET EJECTION HEAD AND METHOD FOR MANUFACTURING THE SAME

(71) Applicant: Xaar Technology Limited, Huntingdon (GB)

(72) Inventors: Michael Walsh, Huntingdon (GB); Alin Ristea, Huntingdon (GB); Colin Brook, Huntingdon (GB); James Caie, Huntingdon (GB); Peter Boltryk, Huntingdon (GB); Nicholas Jackson, Huntingdon (GB); John Tatum, Huntingdon (GB); Michael Watson, Huntingdon (GB); Edward Burton, Huntingdon (GB); James Arnold, Huntingdon (GB); Ryan McCormick, Huntingdon (GB); Jonathan Barker, Huntingdon (GB)

(73) Assignee: XAAR TECHNOLOGY LIMITED, Huntingdon (GB)

( * ) Notice: Subject to any disclaimer, the term of this patent is extended or adjusted under 35 U.S.C. 154(b) by 54 days.

(21) Appl. No.: 17/921,324

(22) PCT Filed: Apr. 27, 2021

(86) PCT No.: PCT/GB2021/051012
§ 371 (c)(1),
(2) Date: Oct. 25, 2022

(87) PCT Pub. No.: WO2021/219987
PCT Pub. Date: Nov. 4, 2021

(65) Prior Publication Data
US 2023/0347648 A1 Nov. 2, 2023

(30) Foreign Application Priority Data
Apr. 27, 2020 (GB) .................................... 2006182

(51) Int. Cl.
*B41J 2/14* (2006.01)
*B41J 2/16* (2006.01)

(52) U.S. Cl.
CPC ......... *B41J 2/14209* (2013.01); *B41J 2/1609* (2013.01); *B41J 2/1618* (2013.01);
(Continued)

(58) Field of Classification Search
CPC .... B41J 2/14209; B41J 2/1609; B41J 2/1618; B41J 2002/14459; B41J 2002/14491;
(Continued)

(56) References Cited

U.S. PATENT DOCUMENTS 5,414,916 A 5/1995 Hayes
5,432,540 A 7/1995 Hiraishi
(Continued)

FOREIGN PATENT DOCUMENTS

CN 102649361 A 8/2012
EP 0869002 A1 10/1998
(Continued)

*Primary Examiner* — Jason S Uhlenhake
*Assistant Examiner* — Alexander D Shenderov
(74) *Attorney, Agent, or Firm* — Honigman LLP; Eric J. Sosenko; Jonathan P. O'Brien

(57) ABSTRACT

An actuator component for a droplet ejection head; wherein said actuator component comprises a substrate and one or more strips of piezoelectric material fixedly attached to said substrate; wherein said one or more strips of piezoelectric material comprise one or more layers of piezoelectric material, and an array of fluid chambers defined within said one or more strips of piezoelectric material and extending in an array direction; wherein said actuator component further comprises one or more cover parts; wherein the or each cover part extends in said array direction and is fixedly attached to at least one of a side face of one of said strips of piezoelectric material and/or at least a portion of said
(Continued)

substrate; and wherein said one or more cover parts comprise a plurality of openings so as to enable fluid to be supplied to selected ones of said fluid chambers through said openings. Associated methods of manufacturing an actuator component for a droplet ejection head are also provided.

19 Claims, 13 Drawing Sheets

(52) U.S. Cl.
CPC ................. *B41J 2002/14459* (2013.01); *B41J 2002/14491* (2013.01)

(58) Field of Classification Search
CPC ...... B41J 2/1623; B41J 2/1631; B41J 2/1632; B41J 2/1634; B41J 2/1646; B41J 2202/11; B41J 2/1642; B41J 2/1643; B41J 2202/12; B41J 2202/10
USPC ............................................................ 347/68
See application file for complete search history.

(56) References Cited

U.S. PATENT DOCUMENTS

| | | | |
|---|---|---|---|
| 5,625,393 | A | 4/1997 | Asai |
| 9,713,924 | B2 | 7/2017 | Morooka et al. |
| 10,086,610 | B2 | 10/2018 | Miyazawa |
| 2003/0063164 | A1 | 4/2003 | Sakuma |
| 2009/0185010 | A1 | 7/2009 | Koseki |
| 2012/0176450 | A1 * | 7/2012 | Akahane .............. B41J 2/14233 347/47 |
| 2013/0162725 | A1 | 6/2013 | Suzuki et al. |
| 2015/0174903 | A1 | 6/2015 | Domae |
| 2015/0258782 | A1 | 9/2015 | Horiguchi et al. |
| 2018/0072058 | A1 * | 3/2018 | Miyazawa ........... B41J 2/04533 |

FOREIGN PATENT DOCUMENTS

| | | | |
|---|---|---|---|
| GB | 2374833 | A | 10/2002 |
| GB | 2521513 | A | 6/2015 |
| JP | H11342606 | A | 12/1999 |
| JP | 2001088309 | A | 4/2001 |
| JP | 2015189031 | A | 11/2015 |
| JP | 2016137589 | A | 8/2016 |
| JP | 2018043426 | A | 3/2018 |
| KR | 10-20110047129 | A | 5/2011 |

* cited by examiner

ACTUATOR COMPONENT FOR A DROPLET EJECTION HEAD AND METHOD FOR MANUFACTURING THE SAME

The present disclosure relates to an actuator component for a droplet ejection head and to a method of manufacturing the actuator component. The actuator component may be particularly suitable for a drop-on-demand ink-jet printhead, or, more generally, a droplet ejection apparatus and, specifically, a droplet ejection apparatus comprising one or more actuator components. The actuator components provide an array of fluid chambers, which each have a piezoelectric actuator element and a nozzle, the piezoelectric actuator element being operable to cause the release, in an ejection direction, of fluid droplets through the nozzle in response to electrical signals.

BACKGROUND

Droplet ejection heads are now in widespread usage, whether in more traditional applications, such as inkjet printing, or in 3D printing, or other rapid prototyping techniques. Accordingly, the fluids, e.g. inks, may have novel chemical properties to adhere to new substrates and increase the functionality of the deposited material. Droplet ejection heads have been developed that are capable of use in industrial applications, for example for printing directly onto substrates such as ceramic tiles or textiles or to form elements such as colour filters in LCD or OLED displays for flat-screen televisions. Such industrial printing techniques using droplet ejection heads allow for short production runs, customization of products and even printing of bespoke designs. It will therefore be appreciated that droplet ejection heads continue to evolve and specialise so as to be suitable for new and/or increasingly challenging applications. However, while a great many developments have been made in the field of droplet ejection heads, there remains room for improvements.

In recent years, there has been increasing interest in printing at higher frequencies and/or in printing using aqueous or electrically conducting inks and fluids. There is also increased interest in flexible designs such that different types of droplet ejection heads with differing functionality can be produced from variants on a base actuator component architecture. Such flexibility has benefits for production responsiveness and inventory requirements and hence for cost savings. However, thus far it has proven difficult to make a flexible droplet ejection head architecture where variants to address different types of fluids or performance requirements can be simply and readily produced.

SUMMARY

The present invention allows ready customisation of a single part or limited number of parts so as to produce printhead variants to address different market and customer requirements, such as operating at higher frequencies, or working with aqueous or electrically conducting inks.

Aspects of the invention are set out in the appended independent claims, while details of particular embodiments of the invention are set out in the appended dependent claims.

According to a first aspect of the disclosure there is provided an actuator component for a droplet ejection head; wherein said actuator component comprises a substrate and one or more strips of piezoelectric material fixedly attached to said substrate; wherein said one or more strips of piezoelectric material comprise one or more layers of piezoelectric material, and an array of fluid chambers defined within said one or more strips of piezoelectric material and extending in an array direction; wherein said actuator component further comprises one or more cover parts; wherein the or each cover part extends in said array direction and is fixedly attached to at least one of a side face of one of said strips of piezoelectric material and/or at least a portion of said substrate; and wherein said one or more cover parts comprise a plurality of openings so as to enable fluid to be supplied to selected ones of said fluid chambers through said openings.

According to certain embodiments the openings provide for an ALA (Alternate Line Active) design.

According to certain other embodiments there is provided a design where the openings provide for flow restrictors.

According to certain other embodiments there is provided a design where the openings provide for both an ALA design and for flow restrictors.

According to certain other embodiments there is provided a design where the array of fluid chambers comprises a main region and also comprises a buffer region at either or both ends of the array of fluid chambers, wherein the openings and/or the fluid chambers in the buffer region(s) differ from those in the main region.

According to a second aspect of the disclosure there is provided a method of manufacturing an actuator component for a droplet ejection head, wherein said method comprises the steps of:

- fixedly attaching one or more strips of piezoelectric material to a substrate;
- forming one or more arrays of fluid chambers in said one or more strips of piezoelectric material;
- forming a wafer that is conformal to said one or more strips of piezoelectric material and said substrate, wherein said wafer comprises one or more parts;
- fixedly attaching at least a part of said wafer to said substrate and at least a part of said wafer to said one or more strips of piezoelectric material;
- removing material from said wafer and thereby forming one or more cover parts which are fixedly attached to a face of one of said strips of piezoelectric material and at least a portion of said substrate; and
- selectively forming a plurality of openings in said cover parts so as to enable fluid to be supplied to selected ones of said fluid chambers through said openings.

According to a third aspect of the disclosure there is provided a method of manufacturing an actuator component for a droplet ejection head, wherein said method comprises the steps of:

- fixedly attaching one or more strips of piezoelectric material to a substrate;
- forming one or more arrays of fluid chambers in said one or more strips of piezoelectric material;
- forming a shape over said substrate and at least a part of said one or more strips of piezoelectric material;
- removing material from said shape and thereby forming one or more cover parts which are fixedly attached to a face of one of said strips of piezoelectric material and/or to at least a portion of said substrate; and
- selectively forming a plurality of openings in said cover parts so as to enable fluid to be supplied to selected ones of said fluid chambers through said openings.

According to a fourth aspect of the disclosure there is provided a droplet ejection head comprising an actuator component according to the first aspect of the disclosure and manufactured according to the second or third aspects of the disclosure.

Figure 1:
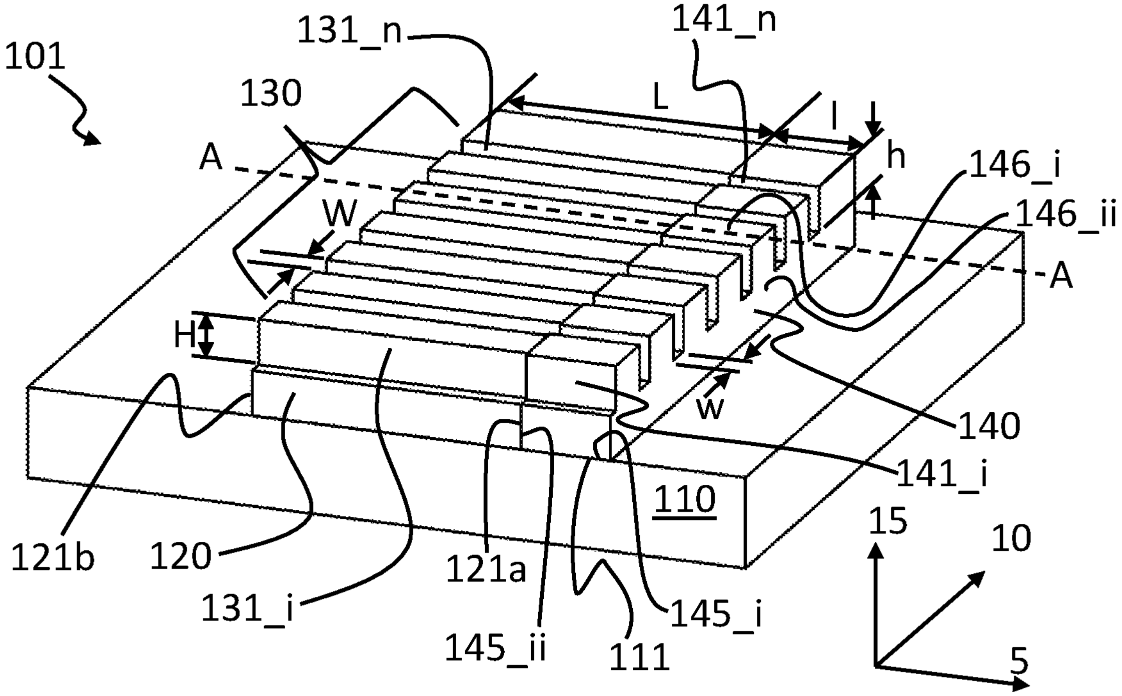
FIG. 1 depicts an actuator component according to an embodiment comprising a cover part to one side of a strip of piezoelectric material, wherein the cover part comprises openings that are narrower than the fluid chambers.

It should be noted that the drawings are not to scale and that certain features may be shown with exaggerated sizes so that these are more clearly visible.

DETAILED DESCRIPTION OF THE DRAWINGS

Embodiments and their various implementations will now be described with reference to the drawings. Throughout the following description, like reference numerals are used for like elements where appropriate.

FIG. 1 depicts an actuator component 101 according to an embodiment comprising a cover part 140 to one side of a piezoelectric strip 120. In more detail, FIG. 1 depicts an actuator component 101 for a droplet ejection head; where the actuator component 101 comprises a substrate 110 and a strip of piezoelectric material 120, or a plurality of such strips of piezoelectric material, fixedly attached to the substrate 110. It should be understood that in this and all embodiments described herein, the or each strip of piezoelectric material 120 may comprise a single layer of piezoelectric material or more than one layer of piezoelectric material; for example it may comprise a laminate comprising layers of piezoelectric material fixedly attached together. Any suitable method of fixing such layers of piezoelectric material together may be utilised. The substrate material 110 may also be made from a piezoelectric material, or alternatively any other suitable material may be used.

The strip of piezoelectric material 120 further comprises an array 130 of fluid chambers defined within the strip of piezoelectric material 120 and extending in an array direction 10. The array 130 of fluid chambers comprises a plurality of fluid chambers 131. The fluid chambers (131_*i*-131_*n*) extend side-by-side in the array direction 10 from a respective first longitudinal end to a respective second, opposite longitudinal end of the array 130 of fluid chambers; said array direction 10 being generally perpendicular to a fluid chamber height direction 15. Each fluid chamber 131 is elongate in a fluid chamber extension direction 5 which is at an angle to the array direction 10, and each fluid chamber 131 forms an open channel in the strip of piezoelectric material 120 (open in the fluid chamber height direction 15 and open at either end in the fluid chamber extension direction 5). To enable the internal geometry of the fluid chambers 131 to be more readily visualised, the first fluid chamber (131_*i*) is shown with one side removed in FIG. 1 (and likewise in FIGS. 3-8).

Figure 2:
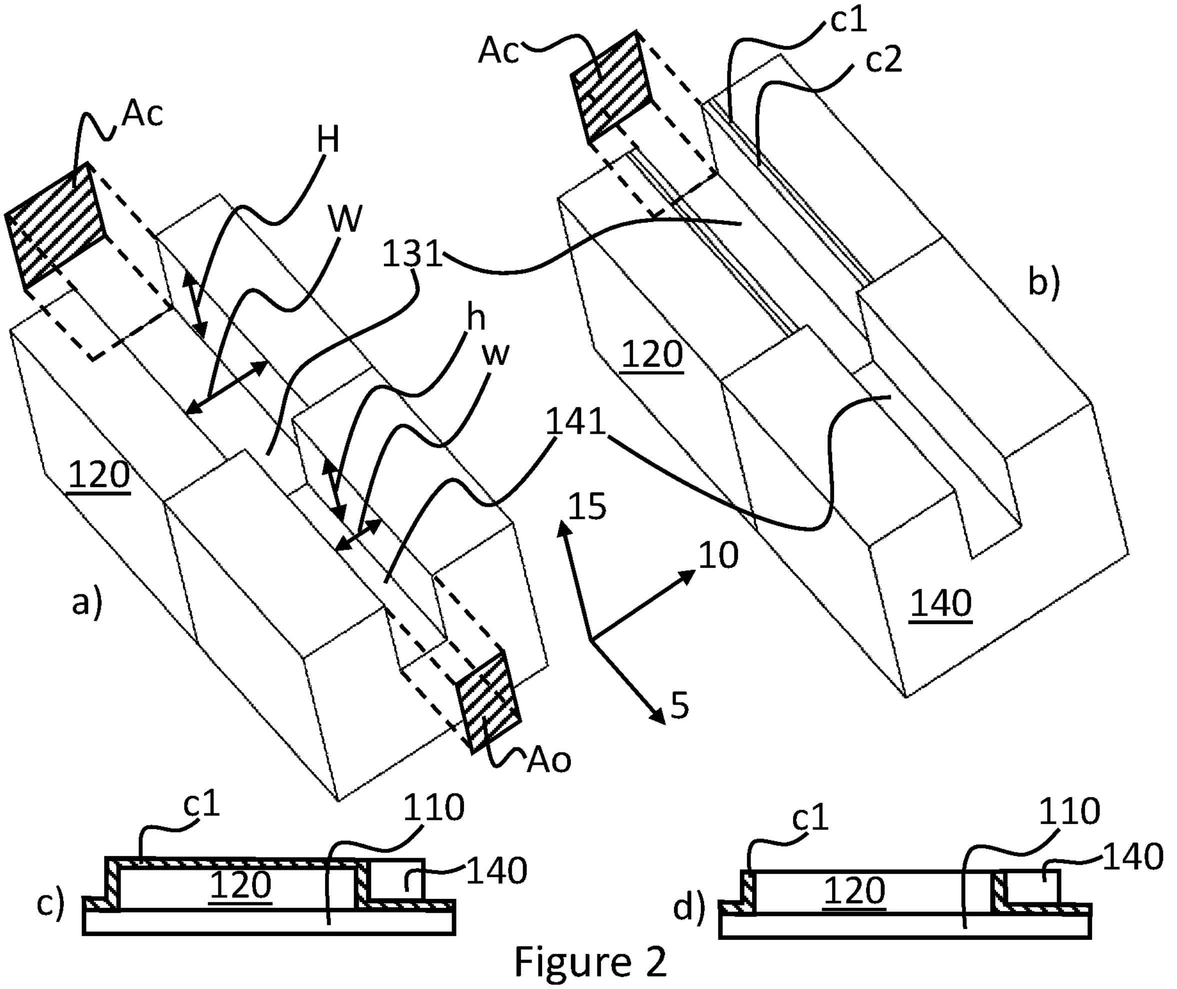
FIG. 2*a* is a detailed view of a fluid chamber and an opening, such as those of FIG. 1.
FIG. 2*b* is a detailed view of a fluid chamber and an opening, similar to that of FIG. 2*a* but where the fluid chamber comprises coating layers.
FIG. 2*c* is a cross-sectional view of part of the actuator component of FIG. 1, along A-A.
FIG. 2*d* is a cross-sectional view corresponding to that of FIG. 2*c*, but at a later point in the production of the actuator component.

In this implementation, the array direction 10 is perpendicular to the fluid chamber extension direction 5, but it should be understood that this is by no means essential and in other implementations the strip of piezoelectric material 120 may be aligned at an angle other than 90° on the substrate 110. The fluid chambers 131 extend side-by-side such that they are parallel to each other in the array direction 10; such an arrangement may allow for close-packing of fluid chambers 131, but this is by no means essential and other arrangements may be envisaged. The fluid chambers 131 have a length L in the fluid chamber extension direction 5, a width W in the array direction 10 and a height H in a fluid chamber height direction 15, and a cross-sectional area Ac=H*W (see FIG. 2*a*).

Considering FIG. 1 further, it can be seen that the actuator component 101 further comprises at least one cover part 140 which extends in the array direction 10, adjacent to the strip of piezoelectric material 120. The or each cover part 140 is fixedly attached to at least one of a side face 121*a* of the strip of piezoelectric material 120 and/or to at least a portion 111 of the substrate 110. It should be understood that in some arrangements the, or each, cover part may be fixedly attached as in the arrangement of FIG. 1, where the cover part 140 comprises two inner faces 145_*i*, 145_*ii* which are fixedly attached to the portion 111 and the side face 121*a* respectively. The cover part 140 may be made of the same material as the strips of piezoelectric material 120, but this is by no means essential and other materials may be used.

The, or each, cover part 140 further comprises a plurality of openings 141 (141_*i*-141_*n*) so as to enable fluid to be supplied to selected ones of the fluid chambers 131 through the openings 141. As for the first fluid chamber 131_*i*, the corresponding first opening 141_*i* is shown with one side removed so that the interior of the opening 141_*i* is visible. In this implementation the actuator component 101 comprises at least one opening 141 per strip of piezoelectric material 120 for each fluid chamber 131. Thus, in this implementation, in use, fluid may flow into and through the openings 141 and then through the fluid chambers 131. As can be seen from FIG. 1, and in detail from FIG. 2*a*, which shows a portion of a fluid chamber 131 and an opening 141, in this implementation the openings 141 have the same height, h, as the height H of the fluid chambers 131 in the fluid chamber height direction 15, but are narrower than them in the array direction 10. As can also be seen in FIG. 1, the openings 141 are shorter than the fluid chambers 131 in the fluid chamber extension direction 5. The openings 141 therefore have a height h, where h=H, a width w, where w<W, and a length l, where l<L; and have a cross-sectional area Ao=h*w, where Ao<Ac.

FIGS. 2*a* and 2*b* depict a portion of a fluid chamber 131 and a portion of an opening 141, such as those of FIG. 1. FIGS. 2*c* and 2*d* depict a portion of a strip of piezoelectric material 120 and substrate 110 along a typical cross-section, such as the location A-A indicated in FIG. 1, at different stages in the construction of the actuator component 101. As detailed in FIG. 2*b*, the fluid chambers 131 may comprise one or more layers c1-*cn* (for example layers c1 and c2 of FIG. 2*b*) deposited on some or all of their internal surfaces, such as a metallic layer or layers to enable actuation of the piezoelectric material, and a protective coating layer or layers to prevent fluids such as inks from causing damage (e.g. corrosion) to the metallic layer(s) and/or to passivate the electronics. Therefore the actuator component 101 comprises electrical tracks and connections. As shown in FIG. 2*c* it should be understood that the metal layer(s) (in this instance a single layer c1, but this is not limiting) may extend over the outer surfaces of the substrate 110 and the strips of piezoelectric material 120.

Such layer(s) may be deposited as continuous layers, built up one at a time, over some or all of the external surfaces of the actuator component 101, such as on the substrate 110 and the strip(s) of piezoelectric material 120, using any suitable method; such as electroless plating or metal sputtering/evaporation. Cutting or other removal techniques may then be used to remove some of the metal layer or layers so as to form electrically isolated electrical tracks and connections. The cover part(s) 140 may then be fixedly attached to the strip of piezoelectric material 120 and the substrate 110 such that at least a portion of the electrical tracks and connections are located between the substrate and the cover part and/or between the strips of piezoelectric material and the cover part. Additional protective layers may be deposited on top of the metal layer(s), prior to attaching the cover part(s) 140, and thereby the actuator component 101 further comprises one or more coating layers c, wherein said coating layers c are located at least in part between the substrate 110 and the cover part 140 and/or between the strips of piezoelectric material 120 and the cover part 140 so as to protect the electrical tracks and connections. Grinding or other removal techniques may be used at a later stage to remove a portion of the layer(s) c1-*cn* and, if necessary, some of the top of the cover part 140, as shown in FIG. 2*d* for a single layer c1. In such an arrangement, the cover part 140 and the attachment means joining it to the substrate 110 and/or the strip of piezoelectric material 120, may provide additional physical protection and electrical isolation to the electrical tracks and connections.

It may further be understood that in some implementations (not shown) some or all of any metallic layer(s) and/or coating or passivation layer(s) c1, c2 . . . cn may be deposited at some point after both the fluid chambers 131 and the openings 141 have been formed, such that both the fluid chambers 131 and the openings 141 comprise layer(s) on some or all of their internal surfaces and the substrate 110, and the strip of piezoelectric material 120 and the cover part(s) 140 comprise layer(s) on some or all of their external surfaces. Still further some layer(s) c may be provided to just the fluid chambers 131 and the strip of piezoelectric material 120 and some layers c_both (not shown) may be provided to both the fluid chambers 131 and the openings 141, and possibly also to the cover part(s) 140, depending on when in the manufacturing process they are provided and by what method. In these cases, it should be understood that the cross-sectional areas Ac of the fluid chambers 131 and/or the cross-sectional areas Ao of the openings 141 will be reduced by any layer(s) that are provided thereto, and that it is the final open cross-sectional areas through which fluid may pass that are of importance when considering the relationships between the cross-sectional areas Ac and Ao of the fluid chambers 131 and the openings 141 respectively (see FIG. 2*b*). It should be understood that, where such metallic and protective layers c and/or c_both are present, the width W, and the height H of the fluid chambers 131 referred to herein (and the width w and height h of the openings 141, when the openings also comprise coatings) are the width W,w and height H,h of the open cross-sectional areas Ac(=H*W) and Ao(=h*w).

Figure 3:
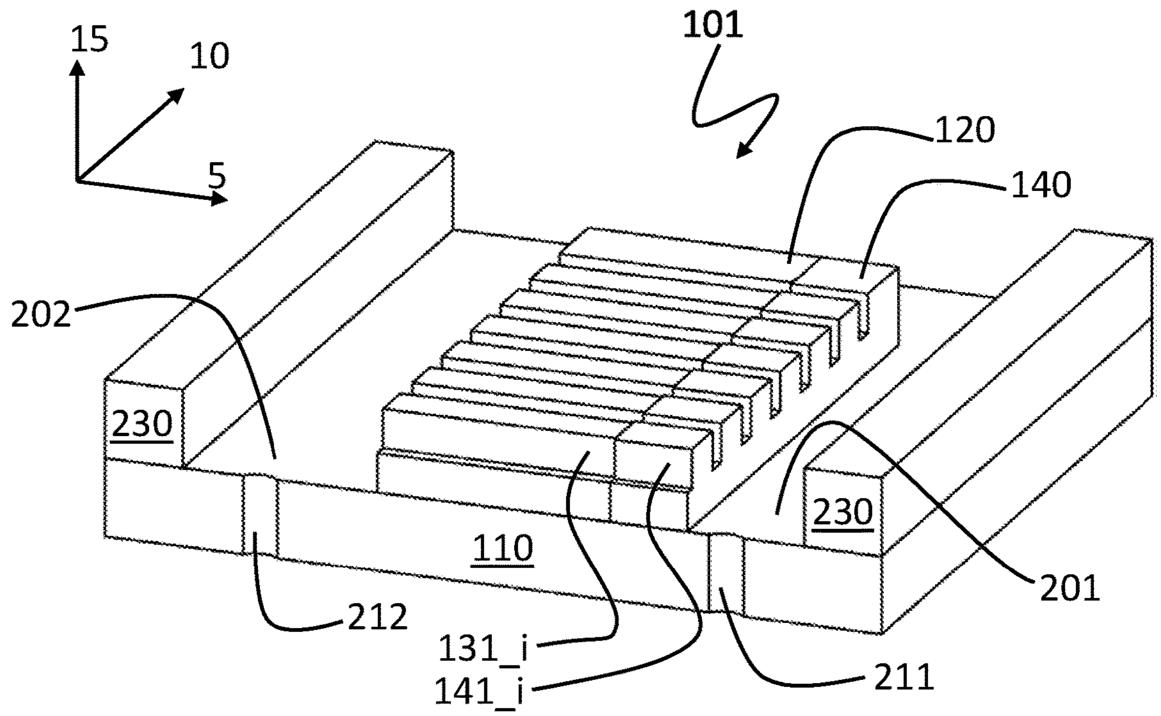
FIG. 3 depicts an actuator component according to FIG. 1, further comprising ports and boundary sections and indicating the fluid paths through the actuator component when installed in a droplet ejection head.

FIG. 3 depicts an actuator component 101 according to FIG. 1 further comprising an inlet port 211, an inlet manifold channel 201, an outlet manifold channel 202 and an outlet port 212. As can be seen from FIG. 3 the actuator component comprises a boundary section 230 on either side of the substrate 110 so that the actuator component 101 comprises one or more manifold channels 201, 202 adjacent to the strip of piezoelectric material 120, wherein each of said one or more manifold channels 201, 202 is fluidically connected to a respective port 211, 212 and, in this arrangement, bounded on their outer edges by the boundary section 230. However, it should be understood that this configuration is by no means essential and that other arrangements and ways of forming the manifold channels 201, 202 may be envisaged in order to supply fluid to the array 130 of fluid chambers. Further, it should be understood that where there are multiple strips of piezoelectric material 120, such that a droplet ejection head comprises multiple arrays 130 of fluid chambers, then the boundaries 230 may contain openings therein to allow fluid to flow between neighbouring manifold channels and hence between neighbouring strips of piezoelectric material 120. Alternatively, configurations where adjacent strips of piezoelectric material 120 share manifold channels may be envisaged. In some implementations, boundaries 230 may be located on the outer boundary of the actuator component 101, or at chosen locations within the actuator component 101 as appropriate, for example if required to separate inlet manifold channels 201 and outlet manifold channels 202, and/or to provide additional structural integrity to the actuator component.

Figure 4:
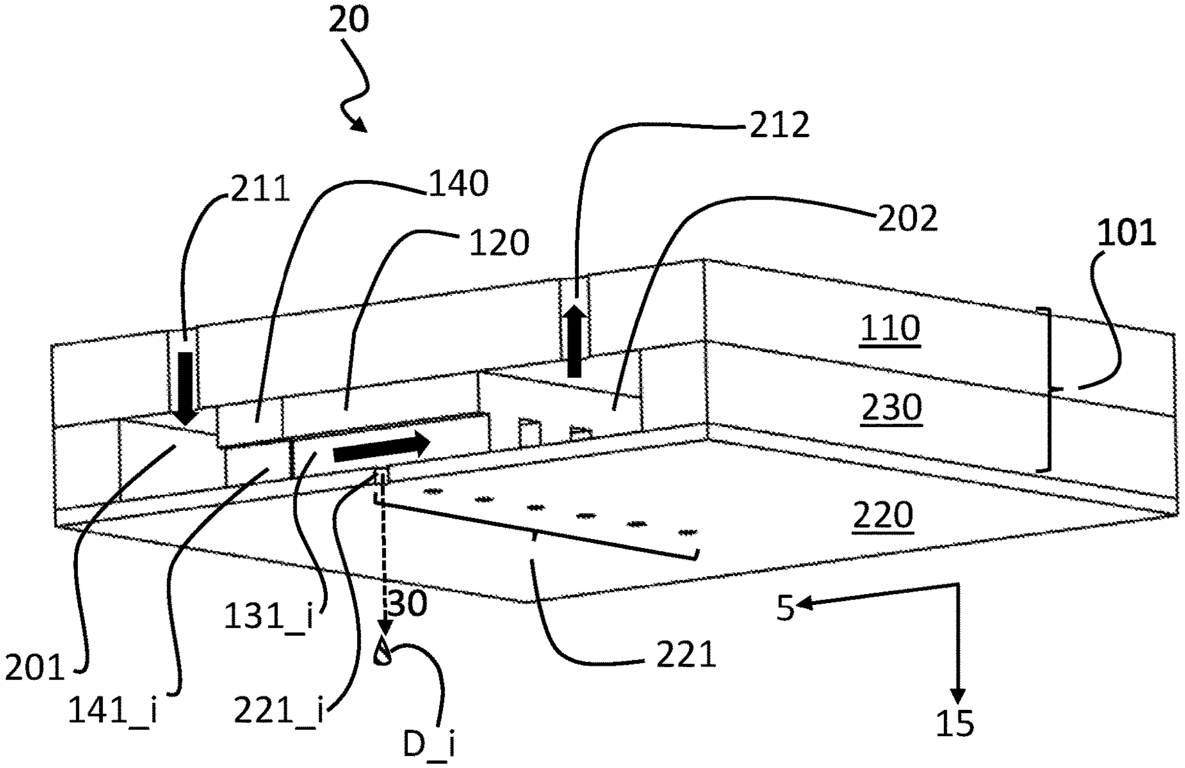
FIG. 4 shows a part of a droplet ejection head comprising an actuator component according to FIG. 3 and further comprising a cover wafer.

Turning now to FIG. 4, this depicts a part of a droplet ejection head 20 comprising the actuator component 101 of FIG. 3 (which has been inverted), and further comprising a nozzle wafer 220 fixedly attached thereto. The nozzle wafer 220 acts to fluidically seal the array 130 of fluid chambers (largely not visible in this view), the openings 141, the manifold channels 201, 202 and the boundary section 230 in the fluid chamber height direction 15.

Nozzles 221 may be formed in the nozzle wafer 220 so that each fluid chamber 131 further comprises one or more nozzles 221.

It should be understood that FIG. 4 is a cross-section through the droplet ejection head 20 and that the boundary section 230 may be formed so as to seal the manifold channels 201, 202 at their longitudinal ends in the array direction 10 or, alternatively, the droplet ejection head 20 may comprise further parts to fluidically seal the ends of the manifold channels 201, 202 in the array direction 10. Therefore, when the actuator component 101 is assembled into a droplet ejection head 20 the fluid chambers 131 are fluidically connected at one end to the inlet manifold channel 201 via the openings 141, and at the other end the fluid chambers 131 are fluidically connected to the outlet manifold channel 202. In this implementation the inlet manifold channel 201 is fluidically connected to an inlet (not shown) via the inlet port 211 and further fluid paths (also not shown), and the outlet manifold channel 202 is fluidically connected to an outlet (not shown) via the outlet port 212 and further fluid paths (also not shown).

During use of the arrangement of FIG. 4, there is a fluid flow from the inlet port 211 into and along the inlet manifold channel 201, into and through each opening 141 and then into and through each fluid chamber 131 in the array 130 of fluid chambers, out of the fluid chambers and into and along the outlet manifold channel 202, and then into the outlet port 212 (generally this arrangement is referred to as a through-flow design). In an alternative arrangement, the actuator component 101 may be assembled into a droplet ejection head 20 which may be arranged to be supplied in gravity mode; in this arrangement both ports 211 and 212 operate as inlet ports, and it should be understood that hence both manifold channels 202, 202 operate as inlet manifold channels so as to supply fluid to both ends of the fluid chambers 131, via the opening(s) 141 on one or both sides of the strip of piezoelectric material 120.

The fluid chambers 131 each comprise one or more piezoelectric actuator elements. The piezoelectric actuator elements are operable to cause the ejection of a fluid droplet D through a nozzle 221 in an ejection direction 30 in response to electrical signals. The ejection direction 30 is generally perpendicular to the array direction 10 and parallel to the chamber height direction 15, as shown in FIG. 4 where a droplet D_i has been ejected from fluid chamber 131_*i*.

It should be understood that in the implementation shown in FIG. 4 the openings 141 act as restrictors, to choke or throttle the fluid flow through the fluid chambers 131 and to attenuate acoustic borne pressure fluctuations and their associated acoustic velocity field disturbances, so as to reduce cross-talk effects between fluid chambers 131 in the array 130 of fluid chambers and thereby enable the droplet ejection head 20 to operate at higher frequencies. Crosstalk is observed in practice as (a) variation in a channel's jetting performance based on the duty cycle of adjacent or near-neighbour channels, and (b) unwanted ejection events in extreme cases. Direct crosstalk effects originate from wall deflections in active channels deforming adjacent channels. Finally, fluidic crosstalk results from pressure waves radiated from the fluid chamber and into the manifold channel(s), and then into surrounding fluid chambers 131 via the fluid path. The addition of restrictor(s) may reduce the fluidic crosstalk and additionally improve drop velocity and volume correlation and therefore the trimming.

It can be seen from FIG. 4 that the nozzle 221_*i* is located at the centre of the fluid chamber 131_*i* in the fluid chamber extension direction 5, with the other nozzles similarly located, but this is by no means limiting and in other implementations the average position of the nozzles may be closer to one or other end of the fluid chamber 131 in the fluid chamber extension direction 5, depending on the fluidic and acoustic performance of the droplet ejection head 20. It may further be understood that whilst FIG. 4 comprises a row of nozzles which are all aligned at the same position in the fluid chamber extension direction 5, this is by no means essential, and in other implementations the nozzle row may comprise nozzles at staggered positions relative to each other.

Figure 5:
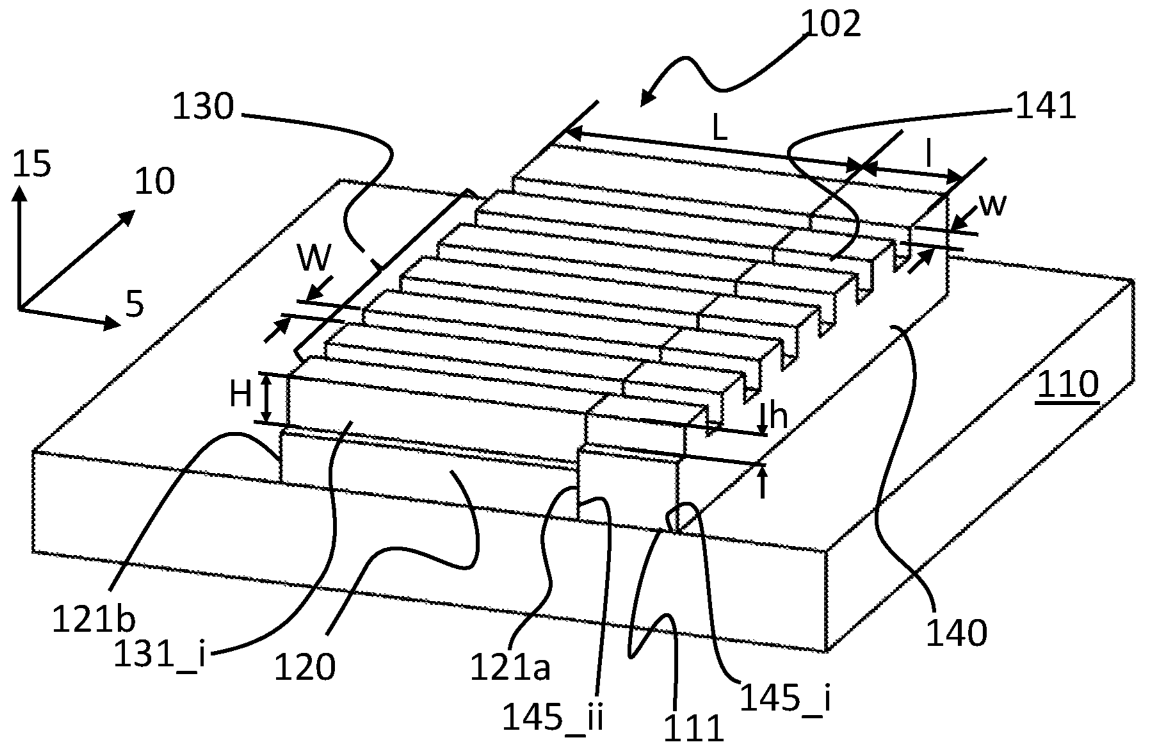
FIG. 5 shows an actuator component according to another embodiment comprising a cover part on one side of a strip of piezoelectric material, wherein the cover part comprises openings that are shallower than the fluid chambers.

Turning now to FIG. 5, this discloses an actuator component 102 according to another embodiment, which is very similar to the actuator component 101 of FIG. 1, therefore like references are used as appropriate. The actuator component 102 comprises a cover part 140 with a plurality of openings 141 that are shallower than the fluid chambers 131 (unlike the actuator component 101 depicted in FIG. 1, where the openings 141 are narrower than the fluid chambers 131). Therefore, the plurality of openings 141 of actuator component 102 have a height $h<H$, and a width $w=W$. In this arrangement the openings 141 also have a length l and the fluid chambers 131 have a length L, both the same as for FIG. 1, where $l<L$. The actuator component 102 could be used in place of the actuator component 101 in the part of the droplet ejection head 20 of FIG. 4, where the openings 141 act as restrictors to the fluid chambers 131.

It should be understood that in some alternative arrangements (not shown), rather than placing the plurality of openings 141 on a first side 121*a* of the array 130 of fluid chambers, they may be placed on a second side 121*b* instead, such that when the actuator component 101, 102 is implemented in a droplet ejection head 20, as in FIG. 4, the plurality of openings 141 would connect the array 130 of fluid chambers to the outlet manifold channel 202 and act to restrict the fluid flow leaving the fluid chambers 131. Thus in such an alternative arrangement, in use, fluid may flow into and through the fluid chambers 131, and then into and through the openings 141.

Figure 6:
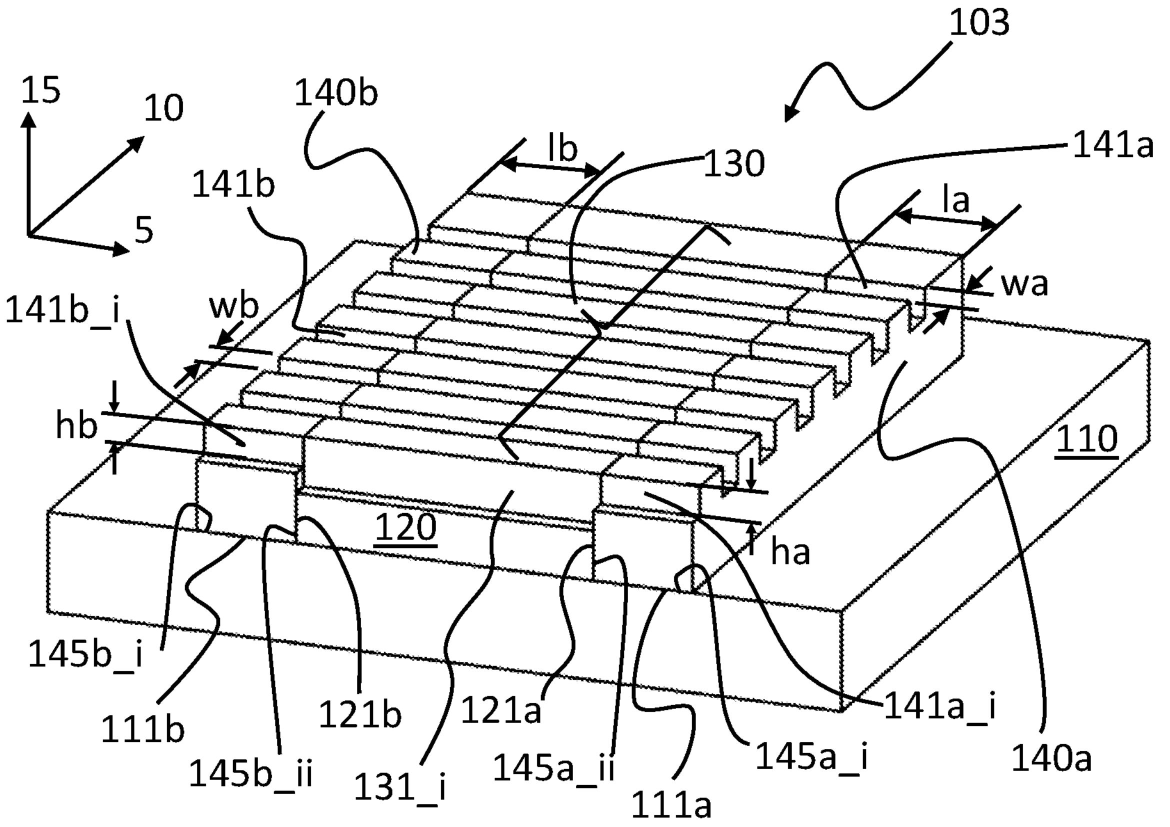
FIG. 6 depicts an actuator component according to another embodiment comprising cover parts on both sides of a strip of piezoelectric material, wherein said cover parts comprise openings that are narrower than the fluid chambers.

Considering now FIG. 6, it can be seen that this is similar to previous arrangements, in FIGS. 1 to 5, but this arrangement depicts an actuator component 103 comprising two cover parts 140*a*, 140*b* which extend in the array direction 10, adjacent to the strip of piezoelectric material 120. The cover parts 140*a*, 140*b* are fixedly attached to a side face 121*a*, 121*b* of the strip of piezoelectric material 120 and to a portion 111*a*, 111*b* of the substrate 110. The cover parts 140*a*, 140*b* comprise inner faces 145*a_i*, 145*b_i*, which are fixedly attached to the portions 111*a*, 111*b* respectively, and inner faces 145*a_ii*, 145*b_ii* which are fixedly attached to the side face 121*a*, 121*b* respectively. It can further be seen that FIG. 6 depicts an actuator component 103 comprising a respective cover part 140*a*, 140*b* on each side of the strip of piezoelectric material 120, wherein both said cover parts 140*a*, 140*b* comprise a plurality of openings 141*a*, 141*b* respectively. It should be understood that the strip of piezoelectric material 120 of FIG. 6 is the same as that of FIGS. 1-5, consequently the height H, width W and length L of the fluid chambers 131 in FIG. 6 are not labelled. In this implementation, the openings 141*a*, 141*b* are shallower than the fluid chambers 131, such that their heights ha and hb are less than the height H of the fluid chambers 131 ($ha<H$, $hb<H$), whilst their widths equal that of the fluid chambers 131 ($wa=wb=W$) and, as before, their lengths are less than that of the fluid chambers 131 ($la<L$, $lb<L$).

In alternative arrangements to that shown in FIG. 6, it may be that the width of the openings 141*a*, 141*b* is altered relative to the fluid chambers 131 such that ($wa<W$, $wb<W$), this may be as well as or instead of altering the heights ha and hb. It should be understood that in some arrangements, as depicted in FIG. 6, it is desirable that the openings 141*a*, 141*b* in the cover parts 140*a* and 140*b* are the same, such that they have the same heights ($ha=hb$) and lengths ($la=lb$) and widths ($wa=wb$) and hence the cross-sectional areas of the openings ($Aoa=ha*wa$, $Aob=hb*wb$) may be the same ($Aoa=Aob$), such that the openings 141 in the cover parts 140*a*, 140*b* on each side of the one or more strips of piezoelectric material 120 have the same length and/or the same width and/or the same height and/or the same cross-sectional area.

In further alternative arrangements, by altering the length, la, lb, in the fluid chamber extension direction 5 of the one or more cover parts 140*a*, 140*b*, the actuator component 103 may comprise fluid chambers 131 that are elongate in a fluid chamber extension direction 5, which is at an angle to said array direction 10, wherein the length, l, of the plurality of openings 141 in the fluid chamber extension direction 5 is less than or equal to the length, L, of the fluid chambers 131 ($l<L$). The length, l, of the openings 141 in the fluid chamber extension direction 5 can be controlled, for example, by utilising different sizes of cover part 140, or by cutting, machining or otherwise altering the cover parts 140 so as to reduce the length la, lb, so as to produce different actuator component designs 101, 102, 103.

Figure 7:
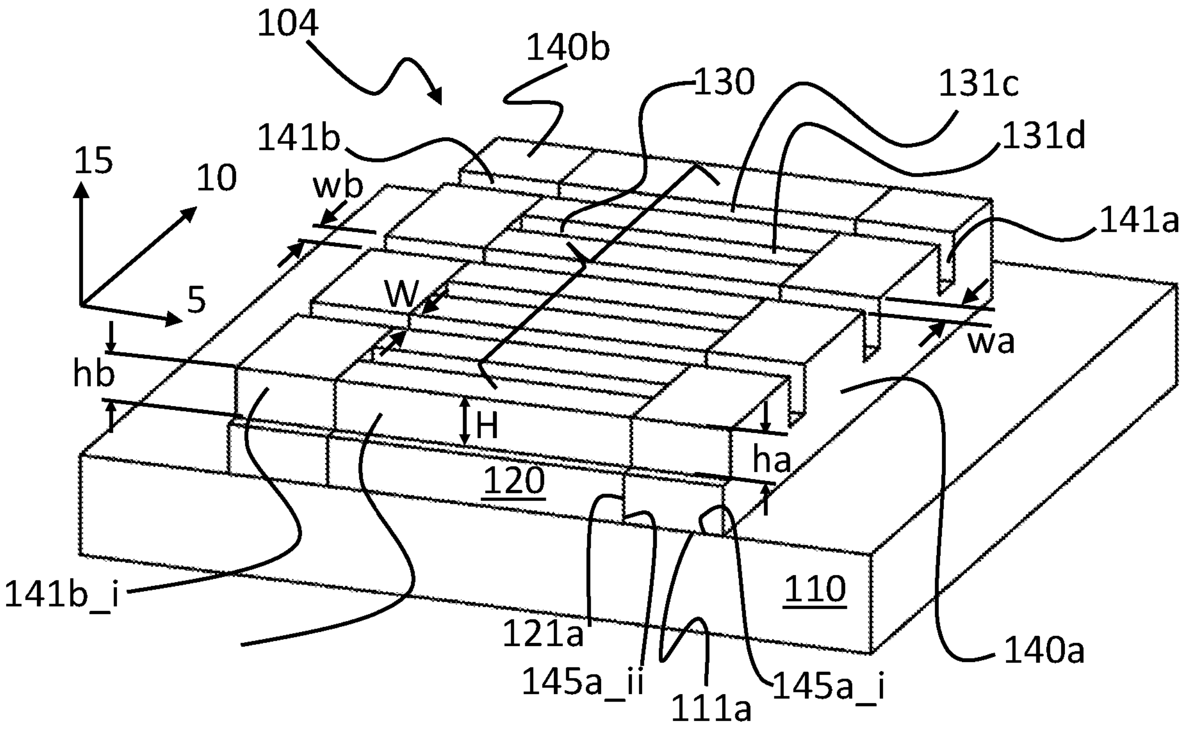
FIG. 7 depicts an actuator component according to another embodiment comprising a respective cover part on each side of a strip of piezoelectric material, wherein the cover parts provide openings to alternate fluid chambers.

Turning now to FIG. 7, this depicts an actuator component 104, which is similar to the actuator component 103 depicted in FIG. 6. This means that the fluid chambers in the array 130 of fluid chambers have the same height H, length L and width W as in FIGS. 5 and 6, and the openings 141*a*, 141*b* have the same height ha, hb, length la, lb and width wa, wb as in FIG. 6. The main difference between the embodiments depicted in FIGS. 6 and 7 is that in FIG. 7 the openings 141*a*, 141*b* are formed in the cover parts 140*a*, 140*b* such that every other fluid chamber 131*c* is connected to openings 141*a* and 141*b*, so that it is open at both ends (so-called 'open' or 'wet' channels), and every other fluid chamber 131*d* is left blocked off at either end (so-called 'dummy' or 'dry' channels). In other words, the number of openings 141*a*, 141*b*, in each cover part 140*a*, 140*b* is half the number of fluid chambers 131 (or alternatively described, equal to the number of 'wet' fluid chambers 131*c*), and the openings 141*a*, 141*b*, in the cover parts 140*a*, 140*b* are aligned so as to selectively leave alternate open fluid chambers 131*c* such that, when installed in a part of a droplet ejection head 20, as per FIG. 4, they are fluidically connected to an inlet manifold channel 201 and an outlet manifold channel 202 so as to allow fluid to flow therethrough.

Thus FIG. 7 depicts an actuator component 104 where there is at least one opening 141*a*, 141*b* per strip of piezoelectric material for every other fluid chamber 131*c*. This is a so-called Alternate Line Active (ALA) design which is suitable for use with, for example, aqueous fluids such as aqueous inks/fluids or with conductive fluids, because the actuator component 104 includes open or 'firing' fluid chambers 131*c*, from which fluid may be ejected through nozzles, as well as dummy or 'non-firing' chambers 131*d*, which are configured such that they are unable to eject droplets. Accordingly, this is an example of an actuator component 104 where there are fewer openings 141 per cover part 140 than there are fluid chambers 131 per strip of piezoelectric material 120. Firing chambers and non-firing chambers are typically alternately arranged, and the non-firing chambers do not allow fluid such as ink to travel therethrough and may not comprise a nozzle (the non-firing chambers may contain a fluid such as air, but are not connected to the inlet or outlet manifolds or the fluidic path and therefore remain 'dry'). It may therefore be understood that when an actuator component with ALA, such as that in FIG. 7, is incorporated in a part of a droplet ejection head 20, such as that depicted in FIG. 4, the number and location of the nozzles 221 in the nozzle wafer 220 is adjusted to align with and match the number of open fluid chambers 131*c*. It may further be understood that the non-firing chambers 131*d* may contain the drive electrodes, which in this way are physically isolated from contact with the fluid, such as ink.

This type of ALA design offers several advantages. For example, this configuration can be used in order to allow aqueous inks to be jetted by placing the drive electrodes in the non-firing chambers 131*d*. In operation the non-firing chambers 131*d* are sent an electrical signal, whereas the firing chambers 131*c* through which the fluid flows are held at ground.

Since electrodes with different potentials are not in contact with the fluid the risk of failure caused by the presence of ionic species in the fluid is removed and the electrodes in the non-firing chambers 131*d* do not need any passivation. Such a design may also be used to reduce the mechanical crosstalk between fluid chambers 131*c*, since they do not share actuator walls. However, a disadvantage is the loss of resolution by doubling the distance between adjacent nozzles. The limitation to resolution is the machinability of the piezoelectric material to create thinner walls while keeping the firing chamber 131*c* dimensions the same to retain acoustic actuation properties. The loss of resolution may be mitigated by using narrower non-firing chambers 131*d* and hence reducing the distance between adjacent firing chambers 131*c* and their nozzles 221. For example the non-firing chambers 131*d* may be half the width of the firing chambers 131*c* (wd=wc/2), or any other suitable ratio of wd:wc). An ALA design may not just be beneficial for aqueous fluids; it may also enable faster print speeds (possibly three times faster) to be used with non-aqueous fluids, leading to productivity improvements.

Considering FIG. 7 further, in this embodiment, the openings 141*a* and 141*b* on either side of the strip of piezoelectric material 120 are the same, and have widths wa and wb and heights ha, hb, that are equal to the width of the fluid chambers 131, such that wa=wb=W and ha=hb=H. As in FIG. 6, the openings 141*a*, 141*b* have lengths la and lb, which in this embodiment are the same as each other and less than the length of the fluid chambers 131 such that la=lb<L. It should be understood that in other implementations it may be desirable to have a design where there is both ALA and also at least one restrictor per open fluid chamber 131*c* upstream and/or downstream of the fluid chambers 131*c*, such that as well as only opening up the fluid chambers 131*c*, either or both of the openings 141*a*, 141*b* may be narrower than the fluid chambers 131*c*, e.g. wa<W, wb<W (similar to the arrangement depicted in FIG. 1) and/or shallower than the fluid chambers 131*c*, e.g. ha<H, hb<H (similar to the arrangement of FIG. 5). Further, as previously described with reference to FIG. 6, there is no requirement that the openings 141*a*, 141*b* are the same, though in some embodiments it may be desirable that the openings 141*a*, 141*b* are the same, such that the cover parts are symmetric across the strip of piezoelectric material 120 (e.g. wa=wb, ha=hb, la=lb).

It should be understood that the actuator components 102, 103, 104 could be used instead of the actuator component 101 in the part of the droplet ejection head 20 of FIG. 4, as could any variant of any of the actuator components described herein. Therefore, the actuator component may comprise a single cover part per strip of piezoelectric material, or it may comprise a respective cover part on each side of the strip of piezoelectric material 120, wherein each of said cover parts 140*a*, 140*b* comprises a plurality of openings. Further, irrespective of whether there is a single cover part or a cover part on each side, the actuator component may comprise a plurality of fluid chambers 131 and a plurality of openings 141 which both have a width in the array direction 10, and wherein the width of the openings, w, is less than or equal to the width of the fluid chambers W (w≤W) or less than the width of the fluid chambers (w<W); and/or the fluid chambers 131 and said plurality of openings 141 may have a height in a fluid chamber height direction 15, wherein the height, h, of the openings is less than or equal to the height, H, of the fluid chambers (h≤H). Further, the actuator component may comprise fluid chambers 131 and a plurality of openings 141 that have a cross sectional area in the array direction 10, where the cross sectional area of the openings (Ao, where in this example Ao=w*h) is less than or equal to the cross sectional area of the fluid chambers (Ac=W*H) such that Ao≤Ac. It should be understood that for a restrictor design, where the plurality of openings on one or both sides of the strip of piezoelectric material act to restrict the flow, an actuator component 101, 102, 103, 104 may comprise a plurality of openings 141 whose cross-sectional area Ao in the array direction 10 is less than the cross-sectional area Ac of the fluid chambers 131 in the array direction (Ao<Ac), either by modifying the height h and/or the width w of the openings 141, whilst an ALA design may, or may not, also comprise a restrictor design, depending on operational requirements.

Figure 8:
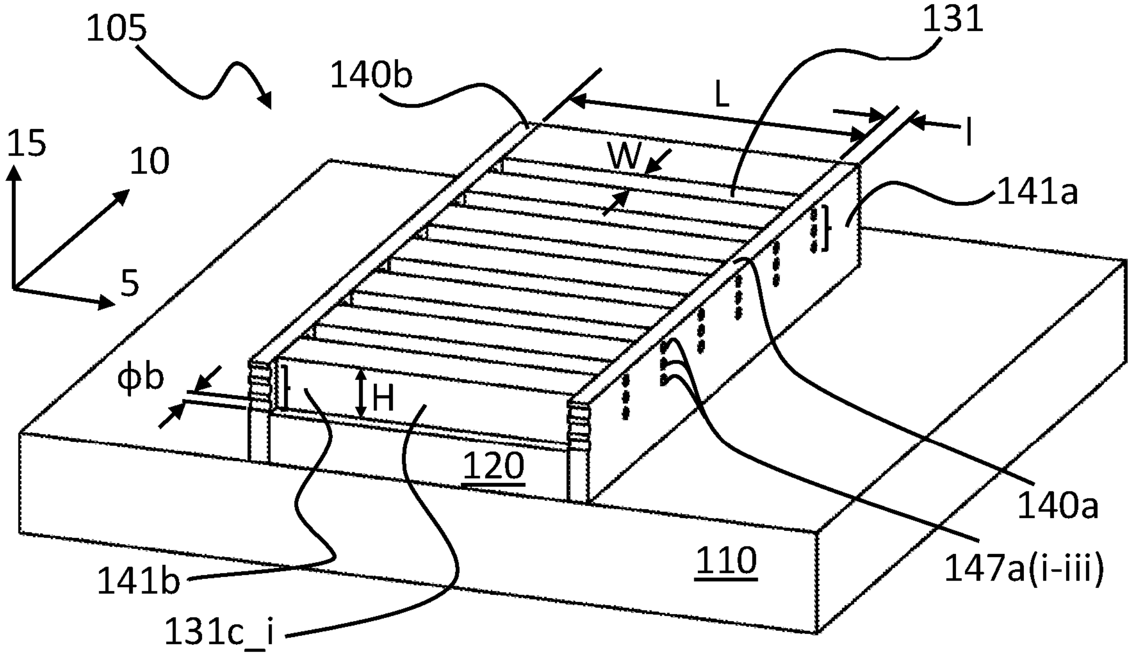
FIG. 8 depicts an actuator component according to another embodiment, where the openings in the cover parts comprise multiple sub-openings per fluid chamber.

Considering now FIG. 8, this depicts an actuator component 105 similar to those of FIGS. 6-7, with cover parts 140*a*, 140*b* on each side of the strip of piezoelectric material 120. The main difference is that the openings 141*a*, 141*b* comprise a plurality of sub-openings 147*a*(*i-iii*) and similarly 147*b*(*i-iii*) (not labelled) with a cross-sectional area Aso. In this particular implementation each opening 141 comprises three circular sub-openings 147(*i-iii*) diameter ϕ, which may conveniently be formed using laser ablation, for example. It should be understood that in an implementation with sub-openings 147 the cross-sectional area Ao of an opening 141 is the sum of the areas of all of the sub-openings 147, e.g. in the implementation of FIG. 8 where there are three sub-openings 147(*i:iii*) $Ao=3*Aso=3*(\pi/4)*\phi^2 \leq Ac$. The actuator component 105 therefore comprises fluid chambers 131 and a plurality of openings 141 which have a cross sectional area Ao in said array direction 10, where the cross sectional area Ao of the openings 141 is less than or equal to the cross sectional area Ac of the fluid chambers 131 in the array direction 10, and where the cross-sectional area Ao of the openings 141 is the sum of the areas of the sub-openings 147. It may be understood that the sub-openings 147 are not particularly limited to any shape or form, and that the calculation of the area Aso of the sub-openings may be adjusted according to their shape.

It may also be observed that in the arrangement if FIG. 8 the cover parts 140*a*, 140*b* are narrower than in previous implementations, such that the length l of the openings 141 is considerably less than the length L of the fluid chambers 131 (l<<L). As previously described with reference to FIG. 6, the length l of the cover parts 140 may be controlled by various methods, such as altering the initial dimensions of the cover parts or by altering them in situ by suitable cutting methods or the like. Alternatively the cover parts may be formed from a material such as a flexible film strip, such as Upilex 50S, which may be attached to the strip of piezoelectric material 120 using any suitable method, such as glue or adhesive strips.

Figure 9A:
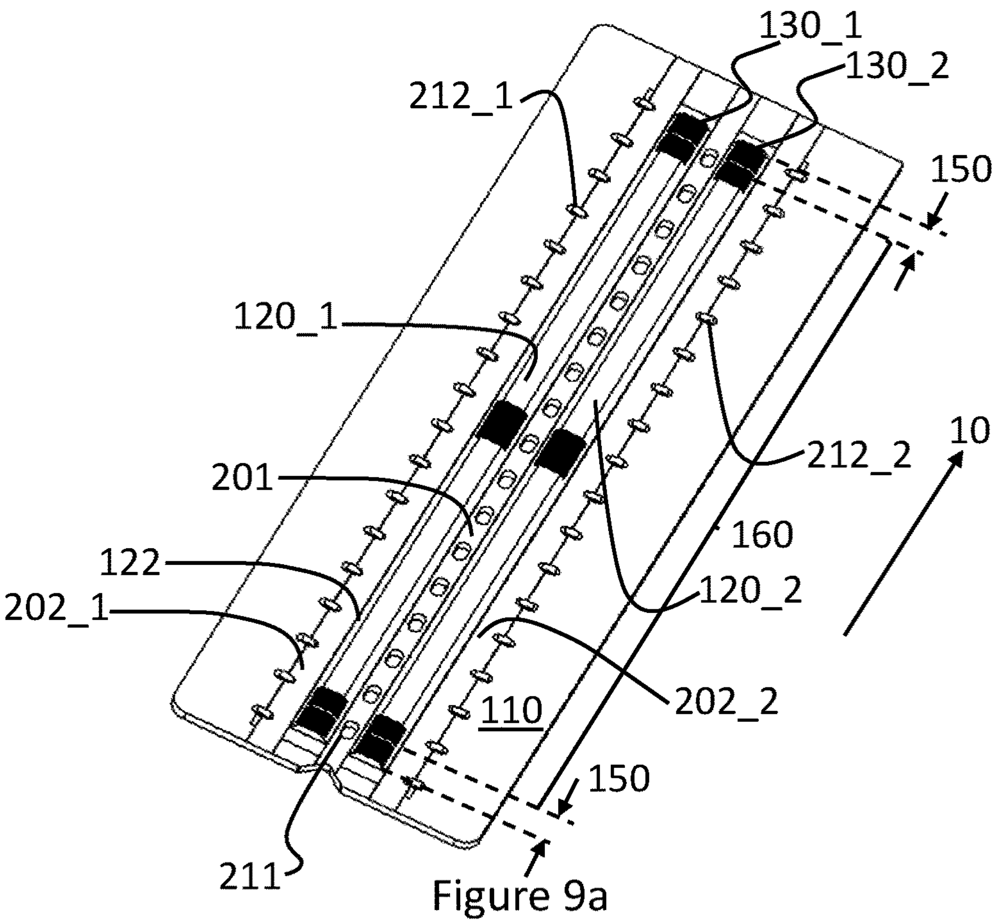
FIG. 9*a* depicts an actuator component comprising two strips of piezoelectric material prior to attaching the cover parts.

FIG. 9*a* depicts an actuator component 106 according to another embodiment at a point when the cover parts 140 have yet to be attached. In this implementation two strips of piezoelectric material 120_1 and 120_2 have been fixedly attached to the substrate 110 and a chamfer 122 applied to their upper edges so as to provide a trapezoidal cross-section to each piezoelectric strip in the chamber extension direction 5. Arrays of fluid chambers 130_1 and 130_2 have been formed in the strips of piezoelectric material 120_1, 120_2 extending in the array direction 10. For clarity the arrays of fluid chambers 130_1, 130_2 are depicted as several discrete regions of fluid chambers 131 along the length of the strips of piezoelectric material 120_1, 120_2 but it should be understood that in actuality the fluid chambers 131 extend along substantially all of the length of the strips of piezoelectric material 120_1, 120_2. In this example the strip of piezoelectric material 120_1, 120_2 (and hence the fluid chambers) may have a length L in the fluid chamber extension direction 5 of between 1500 and 2500 μm, a height H in the chamber height direction 15 of between 300 and 500 μm, for example 350 to 400 μm, and a width W in the array direction 10 of 50 to 100 μm. In a non-limiting example L=1900 μm, H=380 μm and W=70 μm.

It may also be seen from FIG. 9*a* that, in this arrangement, the substrate 110 comprises a plurality of inlet ports 211 in a single row, and a plurality of outlet ports 212_1 and 212_2 arranged in two rows, where each row of ports 211, 212_1, 212_2 extends in the array direction 10. It may further be seen that when the actuator component 106 is fully assembled the plurality of inlet ports 211 will be fluidically connected to a common inlet manifold 201 located between the arrays of fluid chambers 130_1 and 130_2, and that each array of fluid chambers 130_1, 130_2 will be fluidically connected to separate outlet manifolds 202_1 and 202_2, which are then each fluidically connected to a respective row of outlet ports 212_1, 212_2.

Figure 9B:
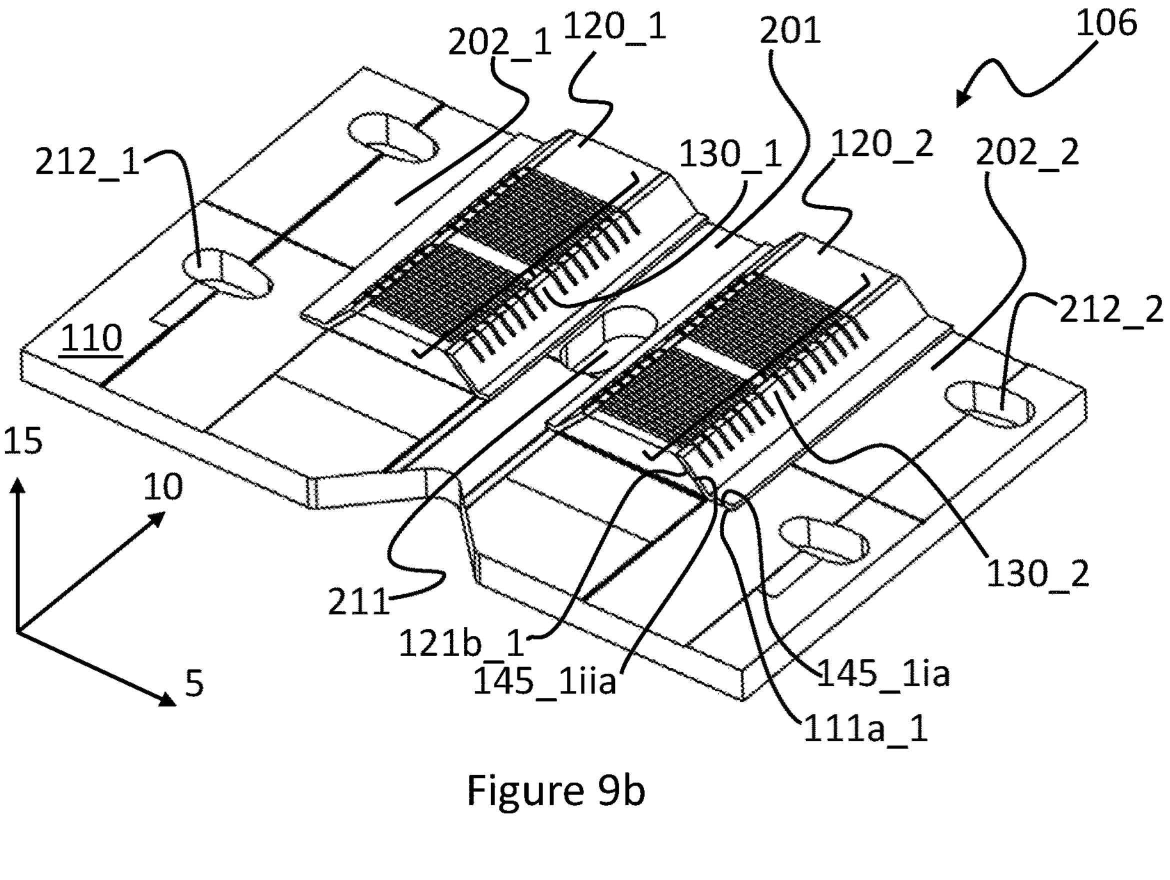
FIGS. 9*b* and 9*c* show details of the actuator component of FIG. 9*a* with cover parts attached, on both sides of each strip of piezoelectric material.
Figure 9C:
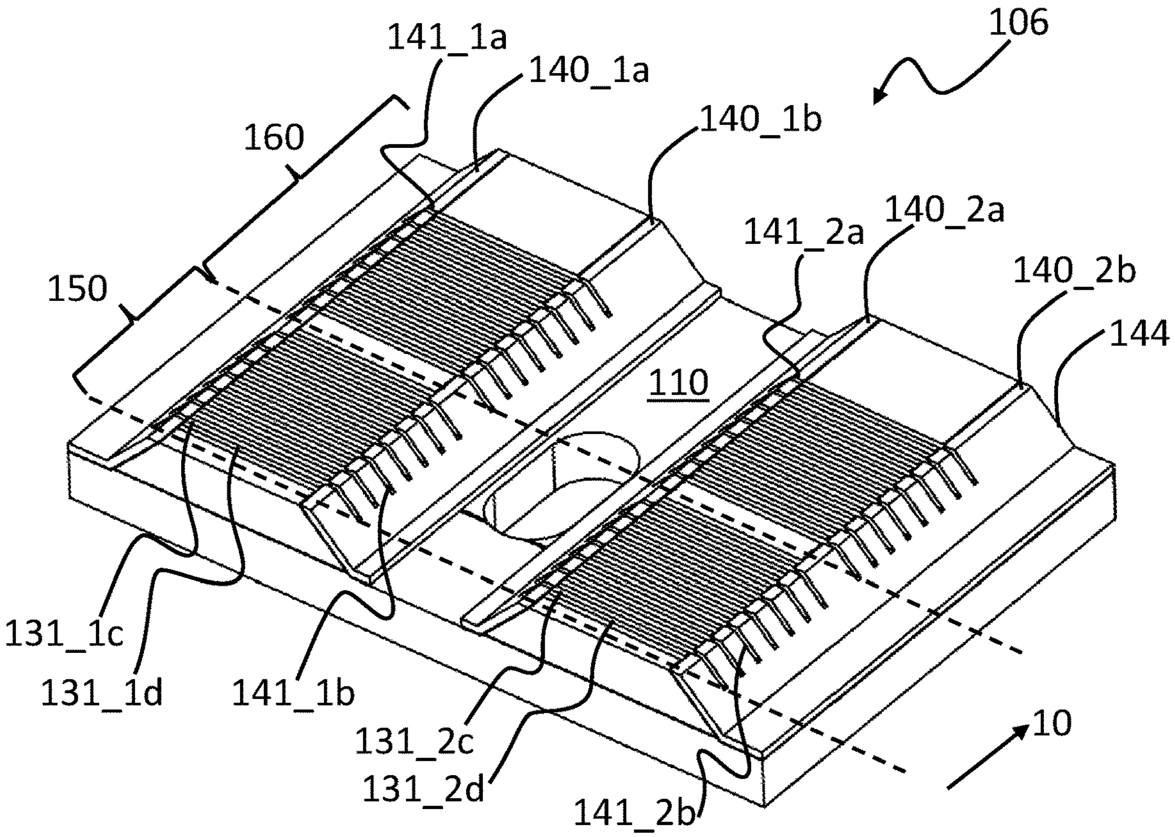

Turning now to FIGS. 9*b* and 9*c*, these depict a detail at one end of the actuator component 106 of FIG. 9*a*. It can be seen that the actuator component 106 comprises a substrate 110 and two strips of piezoelectric material 120_1, 120_2 fixedly attached to said substrate 110; wherein the strips of piezoelectric material 120_1, 120_2 comprise one or more layers of piezoelectric material. The strips of piezoelectric material 120_1, 120_2 comprise an array of fluid chambers 130_1, 130_2 defined within said one or more strips of piezoelectric material 120_1, 120_2 and extending in an array direction 10. The actuator component 106 further comprises cover parts 140_1*a*, 140_1*b*, 140_2*a*, 140_2*b* (See FIG. 9*c*); wherein each of said cover parts 140_1*a*, 140_1*b*, 140_2*a*, 140_2*b* extends in the array direction 10 and is fixedly attached to at least one of a side face of one of said strips of piezoelectric material 120_1, 120_2 and/or at least a portion of said substrate 110. Further, the cover parts 140_1*a*, 140_1*b*, 140_2*a*, 140_2*b* comprise a plurality of openings 141_1*a*, 141_1*b*, 141_2*a*, 141_2*b* so as to enable fluid to be supplied to selected ones of said fluid chambers 131 through said openings 141_1*a*, 141_1*b*, 141_2*a*, 141_2*b*.

It can be seen that in the arrangement of FIGS. 9*b* and 9*c* there are a plurality of cover parts 140_1*a*, 140_1*b*, 140_2*a*, 140_2*b* that have been attached so that there is a respective cover part 140 fixedly attached on each side of each of the strips of piezoelectric material 120_1 and 120_2 and extending in the array direction 10. The cover parts 140 comprise a plurality of openings 141_1*a*, 141_1*b*, 141_2*a*, 141_2*b*. It can be seen from the detail views of FIGS. 9*b* and 9*c* that there are fewer openings 141 than fluid chambers 131 such that each cover part 140_1*a*, 140_1*b*, 140_2*a*, 140_2*b* comprises at least one opening 141_1*a*, 141_1*b*, 141_2*a*, 141_2*b* for every other fluid chamber 131*c* over a substantial portion of the array. That is to say, this is an example of an ALA design, similar to that depicted in FIG. 7. Further, it can be seen that in this embodiment, as in FIG. 7, the openings 141 offer no restriction to the fluid flow, e.g. they are a continuation of the form and shape of the fluid chambers 131, with the same cross-sectional area, Ao=Ac.

It should be understood that where, as in FIGS. 9*a*-9*c*, the strips of piezoelectric material 120_1, 120_2 have a trapezoidal shape, and hence the fluid chambers 131 have a non-cuboidal shape, the cross-sectional area Ac of the fluid chambers 131 may be the cross-sectional area calculated perpendicular to the chamber extension direction 5 in the chamber height direction 15 outside the tapered regions at the ends of the trapezoid. Likewise the cross-sectional area Ao of the openings 141 is the projected cross-sectional area calculated perpendicular to the chamber extension direction 5 in the chamber height direction 15. In such a design, where the openings 141_1*a*, 141_1*b*, 141_2*a*, 141_2*b* are acting to selectively open up alternate fluid chambers 131_1*c*, 131_2*c*, the cover parts 140_1*a*, 140_1*b*, 140_1*c*, 140_1*c* have been formed as narrow strips extending in the array direction 10 on either side of the strips of piezoelectric material 120_1, 120_2, such that the length l of the openings is much less than the length L of the fluid chambers (l<<L).

Considering FIG. 9*c*, which is a detail of FIGS. 9*a* and 9*b*, it can be seen that the fluid chambers 130_1, 130_2 and the openings 141_1*a*, 141_1*b*, 141_2*a*, 141_2*b* comprise a main region 160 and a buffer region 150, where the buffer region 150 is adjacent to the longitudinal ends of the strips of piezoelectric material 120_1, 120_2 in the array direction 10. The main region 160 starts after the buffer region 150 finishes and extends in the array direction 10. A similar, second buffer region 150 may exist at the opposite end of the strips of piezoelectric material 120_1, 120_2 in the array direction 10, with the main region 160 finishing before the second buffer region 150 commences (see, for example, FIG. 9*a*). In the arrangement depicted in FIGS. 9*a*-9*c* the fluid chambers 131 in the main region 160 and the buffer region 150 have the same cross-sectional area. In this arrangement the fluid chambers 131 in the buffer region 150 have no nozzles (not shown), so cannot eject ink, but, in use, allow fluid to travel therethrough. It is believed that this arrangement improves the flow uniformity along the actuator component 106 in the array direction 10 and also aids in improving the stress profile along the actuator component 106 in the array direction 10 and therefore improves the droplet ejection performance and print quality (as stress in actuator components such as those described herein can lead to flow non-uniformity that 'prints through' into observable defects in the printed image or product).

It should be understood that, in other arrangements, the buffer region(s) 150 may comprise fluid chambers 131 and/or openings 141 that are configured differently to those in the main region 160. For example, the fluid chambers 131 (and hence openings 141) in the buffer region(s) 150 may be spaced differently (closer together or further apart). Alternatively, the fluid chambers 131 in the buffer region(s) 150 may be wider/narrower or taller/shallower;

or they may not have a metallic layer or layers in them, such that Ac_150≠Ac_160. Further, the fluid chambers 131 in the buffer region 150 may not be actuated/may be driven differently in any driving schemes when the actuator component 106 is installed in a droplet ejection head 20, so that the fluid chambers 131 do not act to eject droplets. Still further, in some arrangements, the fluid chambers 131 in the buffer region 150 may not comprise nozzles 221 (not shown in FIG. 9*c*).

In alternative arrangements the fluid chambers 131 in the buffer region 150 may be the same as the fluid chambers in the main region 160 such that Ac_150=Ac_160, but the openings 141 in the buffer region 150 may be different to those in the main region 160. For example, in a design where the main region is ALA (openings 141 for every other fluid chamber 131), the fluid chambers 131 in the buffer region 150 may have an opening 141 for every fluid chamber 131; alternatively there may be unopened (dummy) fluid chambers 131 in the buffer region 150, whether or not the main region 160 is an ALA design, such that the actuator component comprises fewer openings 141 per cover part 140 than fluid chambers 131 per strip of piezoelectric material.

In some arrangements the openings 141 in the buffer region 150 may be wider/narrower or taller/shallower than in the main region 160, such that Ao_150≠Ao_160. Alternatively, in a design comprising openings 141 that act as restrictors (with or without ALA), where the openings 141 in the main region 160 have a cross-sectional area Ao_160<Ac_160, the buffer region(s) 150 at either or both ends of the array 130 of fluid chambers may comprise openings 141 that are equal to the width W_150

(w_150=W_150) or height H_150 (h_150=H_150), or cross-sectional area Ac (Ao_150=Ac_150), of the fluid chambers 131 in the buffer region 150; or may be equal to the width or height, or cross-sectional area, of the fluid chambers 131 excluding the thickness of any coating layers the fluid chambers may comprise (e.g. the metallic and coating layers may not be formed, or may be removed from the fluid chambers 131 in the buffer region 150). Alternatively the openings 141 may have a different width and/or height and/or cross-sectional area to the fluid chambers 131 in the buffer region 150. Further the openings 141 may have a different width and/or height and/or cross-sectional area to the openings 141 in the main region 160. It should be understood that in some implementations such a buffer region 150 may be of benefit to the fluidic flow performance within the droplet ejection head 20, or to improve the stress profile within the actuator component, both of which may affect the droplet ejection performance.

Still further the buffer region(s) 150 may comprise two or more sub-buffer-regions with different arrangements of fluid chambers 131 and/or openings 141 in the two or more sub-buffer-regions, so as to address different requirements of the printhead such as fluidic performance or stress relief in the actuator component.

Considering FIG. 9*a* further, it can be seen that when the actuator component 106 is installed in a droplet ejection head 20 the arrangement may be such that there is a single inlet manifold channel 201 and double outlet manifold channels 202_1 and 202_2, though this is by no means necessary and in other arrangements there may be other configurations of inlet and outlet manifold channels, though at least one of said manifold channels is fluidically connected to one or more inlets. Further, where there are two or more manifold channels, at least one may be fluidically connected to one or more outlets.

In some arrangements it may be desirable to modify the width w of the openings 141 such that the actuator component comprises openings 141 whose width w is different in different parts of the array 130 of fluid chambers, for example where the buffer region 150 comprises openings 141 whose width w_150 is different to the openings 141 in the main region 160. Alternatively, or as well, the width w of the openings 141 on one or both sides of the one or more strips of piezoelectric material 120 may increase with increasing distance from each of said one or more inlet ports 211 and/or each of said one or more outlet ports 212. For example, considering again FIG. 9*a*, it can be seen that the substrate 110 comprises a plurality of inlet ports 211 and a plurality of outlet ports 212_1 and 212_2. An arrangement where the width w of the openings 141 on one or both sides of the strip of piezoelectric material 120 increases with increasing distance from an inlet 211 and/or outlet port 212_1 and 212_2 may improve the fluid flow performance. For example it may improve the consistency of the fluid supply to all of the fluid chambers 131, so that those closer to the ports 211, 212_1 and 212_2 are not preferentially supplied with fluid.

FIGS. 9*b* and 9*c* depict an actuator component 106 where the cover parts 140_1*a*, 140_1*b*, 140_2*a*, 140_2*b* have been shaped such that the cover parts comprise one or more outer faces that are not fixedly attached to a part of one of said strips of piezoelectric material 120_1, 120_2 or to at least a portion of the substrate 110, and wherein at least one of said outer faces comprises a shaped profile. In the arrangement of FIGS. 9*b* and 9*c* they comprise a chamfer 144 wherein the chamfer 144 is substantially parallel to a chamfer 122 on the underlying strip of piezoelectric material 120_1, 120_2, though it should be understood that this is by no means essential and in other arrangements the chamfer 144 may be at a different angle to the chamfer 122.

Figure 9D:
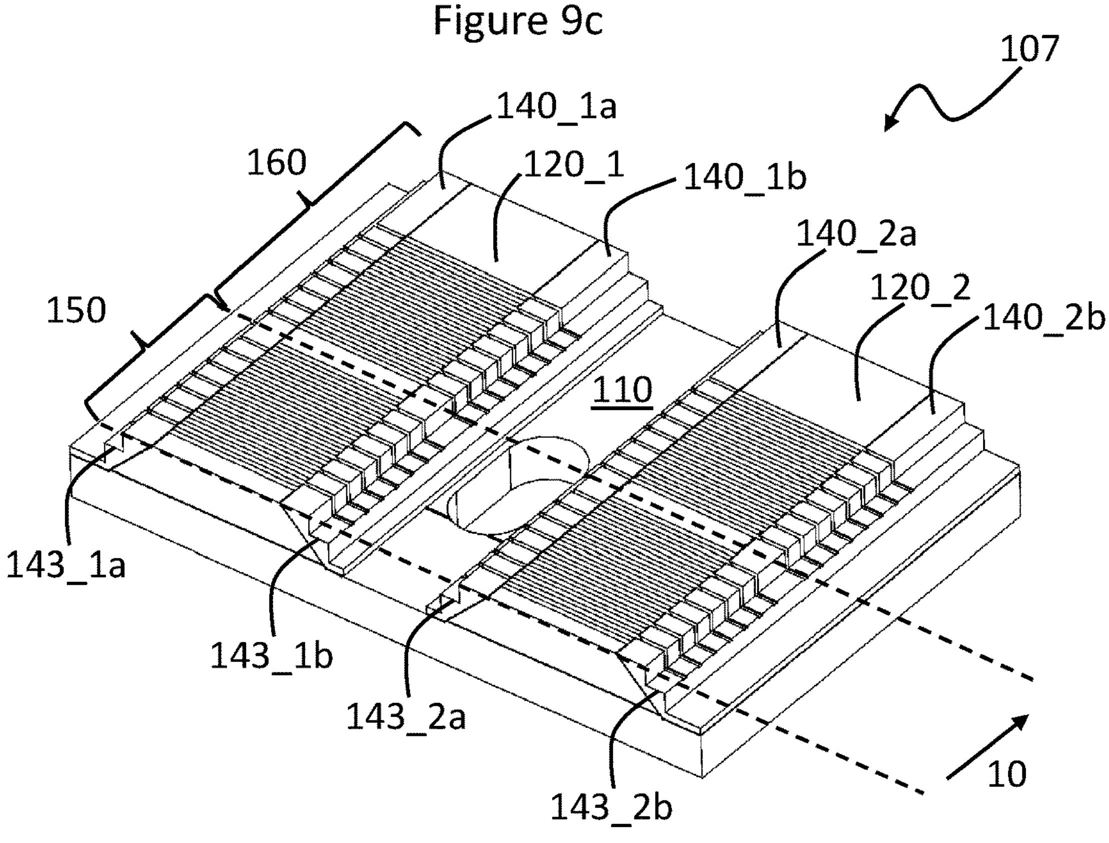
FIG. 9*d* depicts a variant of the actuator component of FIGS. 9*b* and 9*c* with a cover part that has additional shaping.

FIG. 9*d* depicts an alternative actuator component 107, similar to that of FIGS. 9*b* and 9*c*, the main difference being that the outer faces of the cover parts 140_1*a*, 140_1*b*, 140_2*a*, 140_2*b* have a stepped profile 143_1*a*, 143_1*b*, 143_2*a*, 143_2*b*. Such steps may act to deflect pressure waves away from the openings 141 and thereby reduce cross-talk between fluid chambers. It should be understood that in other arrangements the cover parts 140_1*a*, 140_1*b*, 140_2*a*, 140_2*b* may have any suitable and achievable shaped profile 143 on one or more of the outer faces of the one or more cover parts 140_1*a*, 140_1*b*, 140_2*a*, 140_2*b*, such that said shaped profile comprises a chamfer 144, or a concave or convex profile or a stepped profile extending along the length of the cover part in the array direction 10.

Figure 10A:
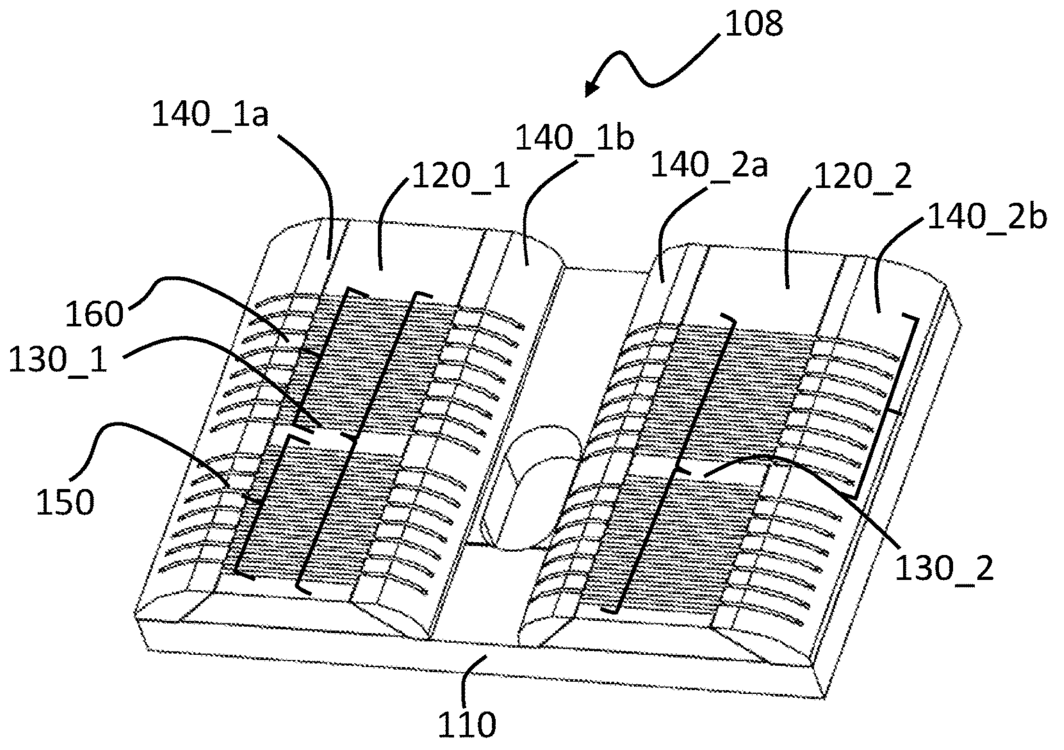
FIG. 10*a* depicts an actuator component according to another arrangement where the cover parts comprise a material built up in layers.

FIG. 10*a* depicts an actuator component 107 where the cover parts 140_1*a*, 140_2*a*, 140_1*b*, 140_2*b* have been built up by depositing a layer or a series of layers of a flowable flexible material—for example a resin (e.g. Delo OB787 adhesive) may be applied to the strip(s) of piezoelectric material 120_1, 120_2 and to the substrate 110. It should be understood that other materials may be used, such as a UV curable resin, or a polymer resin, or other adhesives or glues, or any suitable polymer, for example any material that is flowable and/or suitably deformable. As an example, consider FIG. 10*b*, which shows schematically a single dry fluid chamber 131*d* with layers of cover parts 140_2*ai-iii*, 140_2*bi-iii* attached to the outside of the strip of piezoelectric material 120 and to the substrate 110. Such cover part material layers 140_2*ai-iii*, 140_2*bi-iii* may then harden or be hardened in situ. For example, some materials may harden with time, or be UV curable or thermally curable. The layers may deform and fuse together into a homogenous whole, or remain as distinct but attached layers.

Considering the arrangement of FIG. 10*a* further, it should be understood that such cover parts 140_1*a*, 140_2*a*, 140_1*b*, 140_2*b* may also comprise layers with differing properties, so as to form a multilamellar solid block with different layers providing complementary properties such as adhesion, compliance, chemical resistance etc. It could also comprise a multiphase block incorporating air gaps to allow pulse damping, low dielectric insulation and compliance. The compliance of the cover parts 140_1*a*, 140_2*a*, 140_1*b*, 140_2*b* may be adjusted to optimise performance by changes in chemistry and/or the inclusion of gas bubbles. The advantage of using such a flexible material is that the design can be readily altered and implemented and the internal geometry and fluid flow path of the actuator component 107 can be changed readily with high resolution.

Figure 10B:
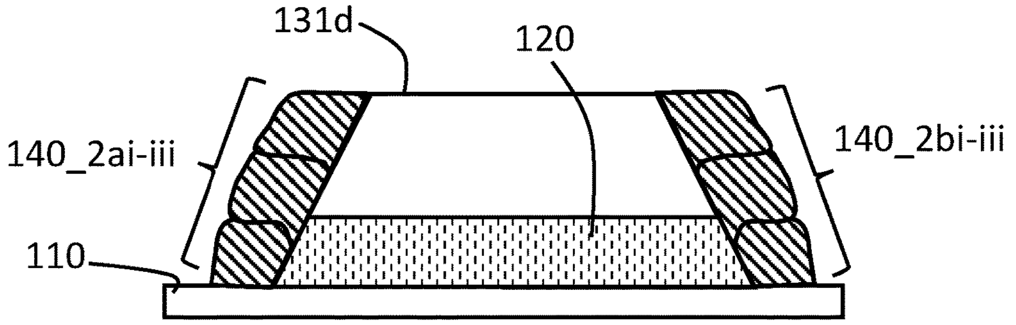
FIG. 10*b* depicts a cross-section of a fluid chamber of the actuator component of FIG. 10*a* detailing the layers of material.
Figure 10C:
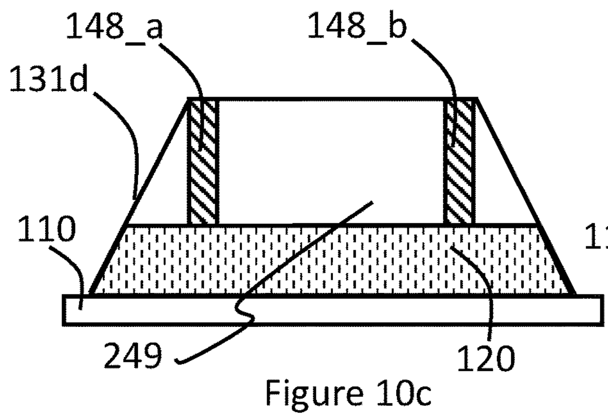
FIG. 10*c* depicts a cross-section of a fluid chamber similar to that of FIG. 10*b*, but wherein the cover parts comprise a pillar inside the fluid chamber.
Figure 10D:
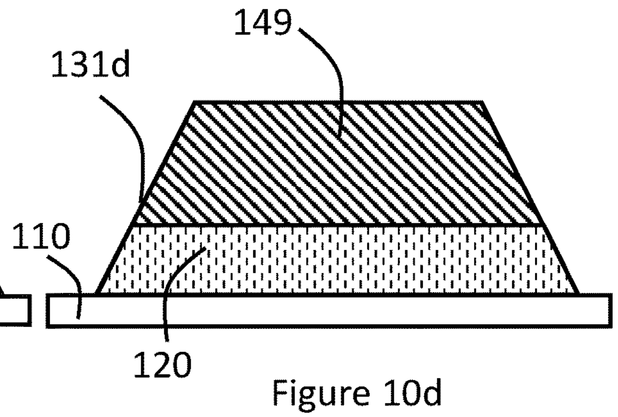
FIG. 10*d* depicts a cross-section of a fluid chamber similar to that of FIG. 10*b*, but wherein the cover parts comprise filling that fills the fluid chamber.

Considering now FIGS. 10*c* and 10*d*, in some ALA arrangements the cover parts 140 may instead comprise filling some or all of the dry fluid chambers 131*d*. For example, the cover parts may comprise pillars 148_*a*, 148_*b* at the ends of the fluid chambers 131*d* (as in FIG. 10*c*) with an air gap 249 in the remainder of the fluid chamber 131*d*, or they may be filled entirely with a fill 149 (as in FIG. 10*d*). Still further the air gap 249 may be replaced with a fill 249 with chosen properties, such as electrical passivation or high levels of compressibility so as to deform readily when the fluid chamber walls are deflected in operation. It may further be understood that in some arrangements the implementations of FIGS. 10*a* and 10*b*, with external cover parts 140_1*a*, 140_2*a*, 140_1*b*, 140_2*b*, may be combined with the arrangements of FIG. 10*c* or 10*d* so as to comprise cover parts that are both external and attached to the strip of piezoelectric material 120, and that also comprise parts that partially or completely fill the dry fluid chambers 131*d* such as pillars 148 or a complete fill 149 or pillars 148 and a fill 249 of one or more materials. Still further, internal fills or pillars and fills may be combined with any of the actuator components described herein.

Figure 11A:
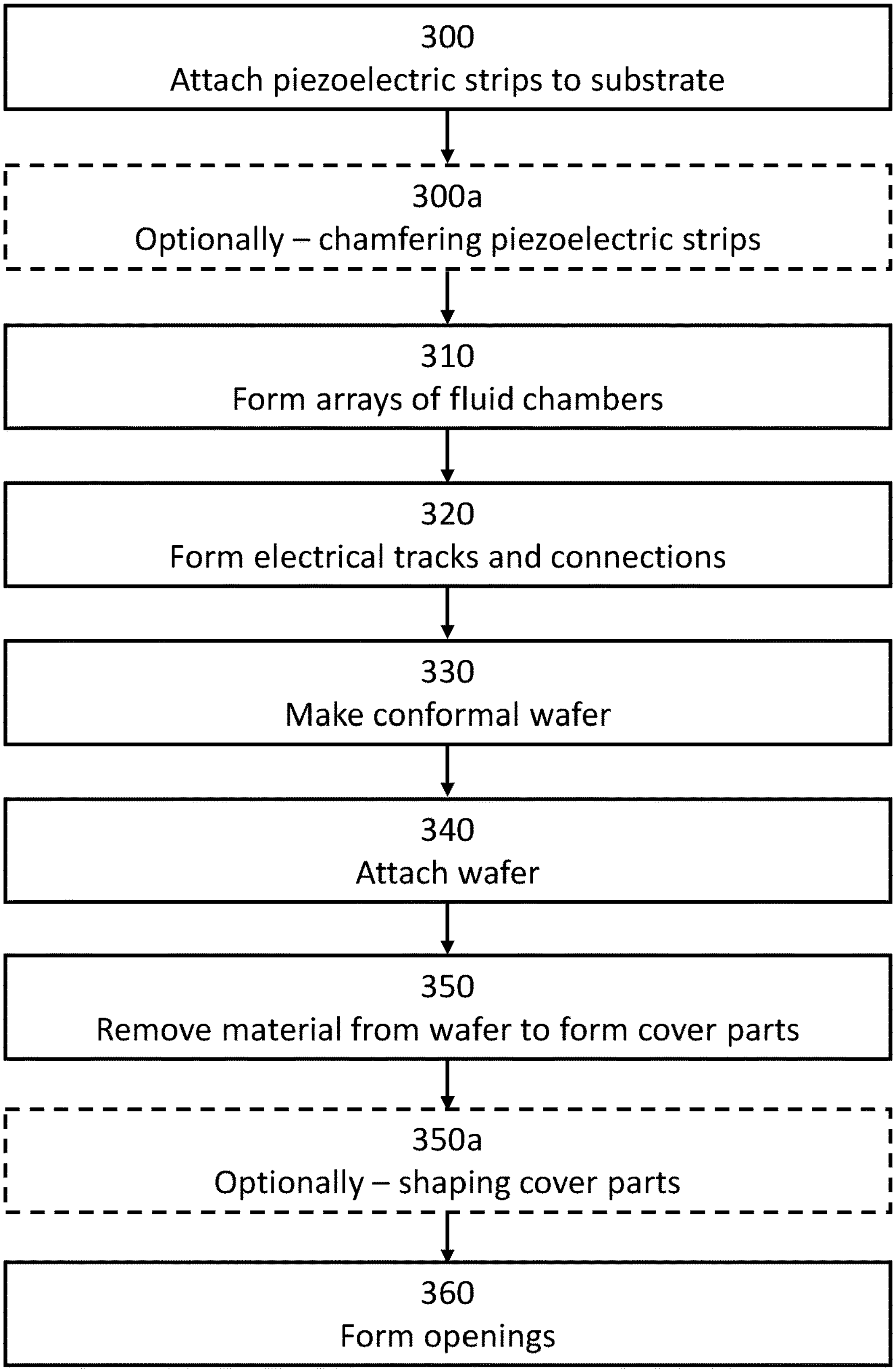
FIG. 11*a* is a flow chart showing steps in the manufacture of an actuator component.
Figure 11B:
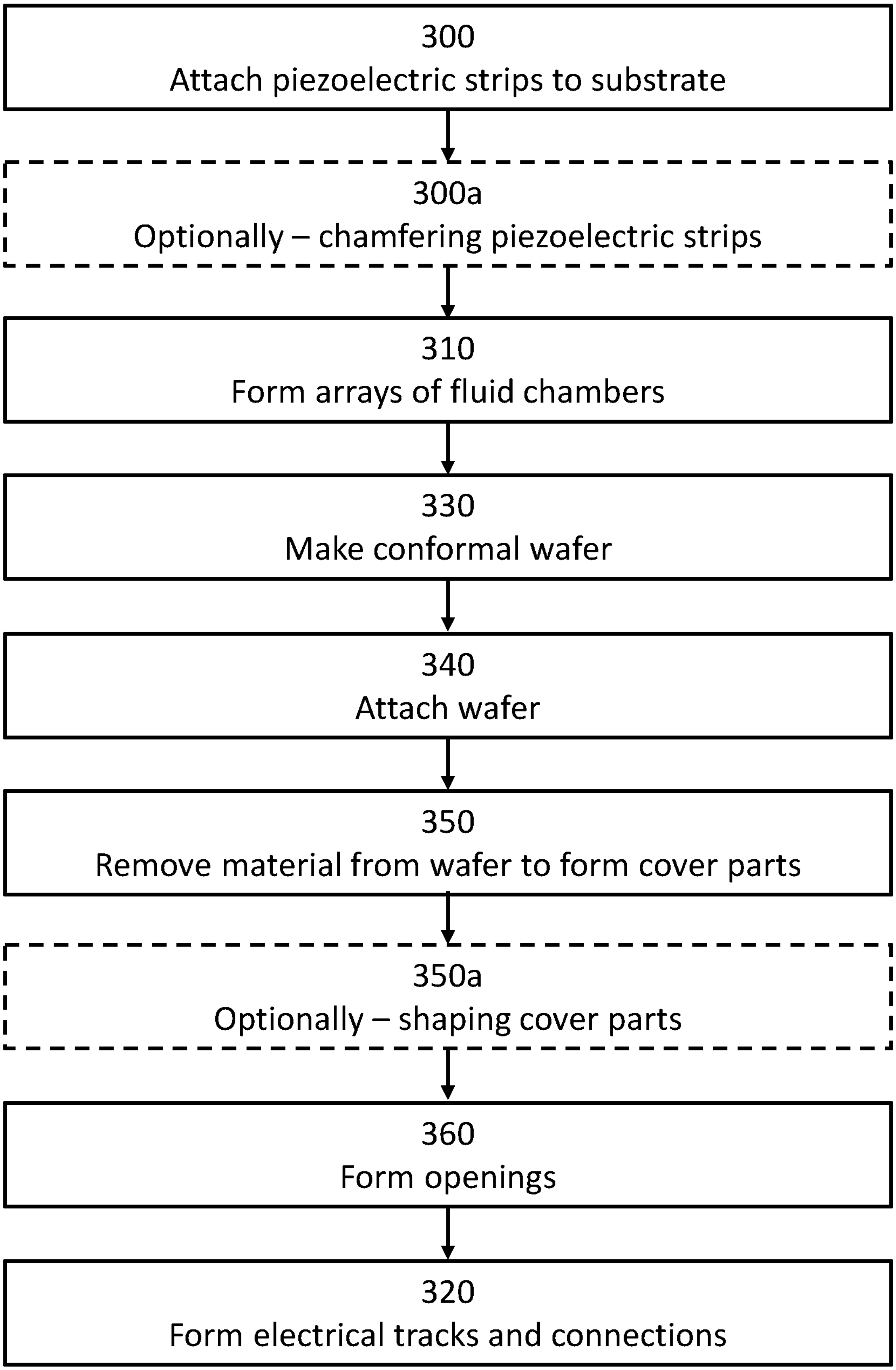
FIG. 11*b* is an alternative flow chart depicting steps in the manufacture of an actuator component.
Figure 12A:
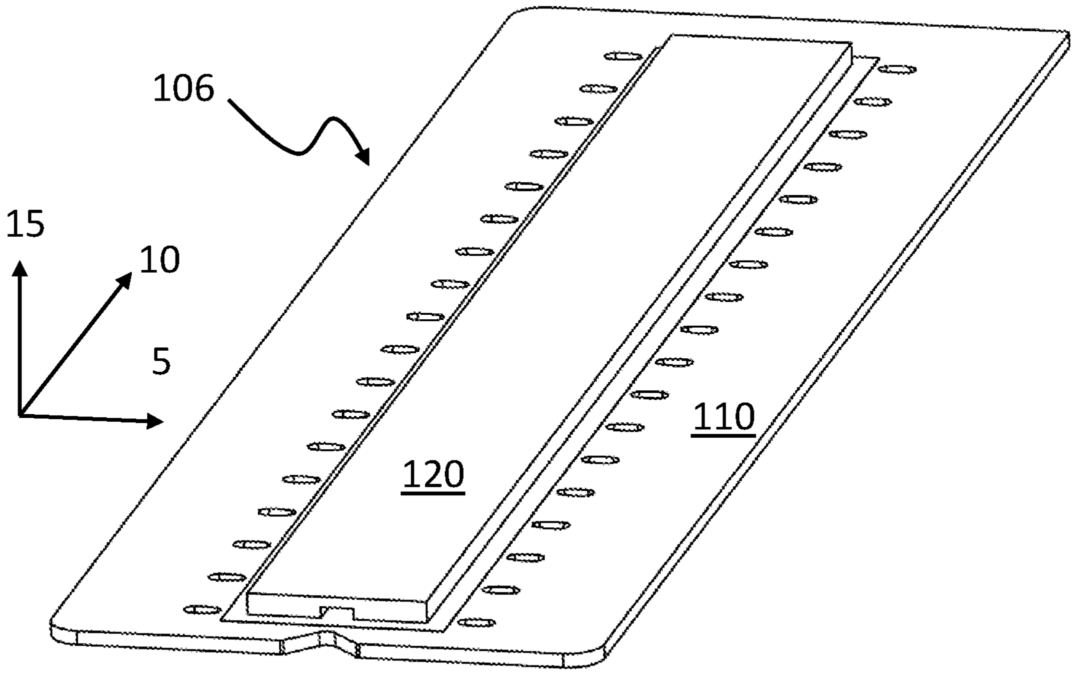
FIG. 12*a* depicts a process step in the manufacture of an actuator component according to the embodiment of FIGS. 10*a*-10*d;*
Figure 12B:
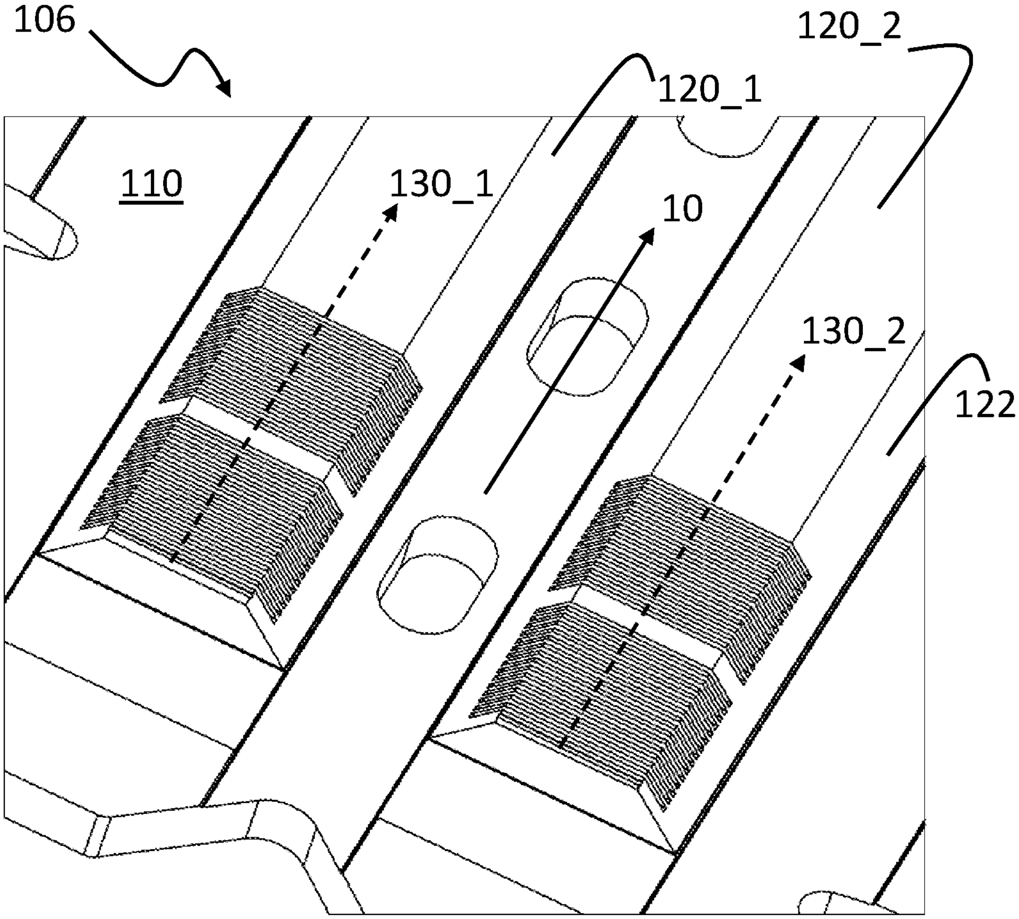
FIG. 12*b* depicts a further process step from that of FIG. 12*a*, where the two strips of piezoelectric material are chamfered to give a trapezoidal profile and arrays of fluid chambers are formed in the strips of piezoelectric material.

Turning now to FIG. 11*a*, this summarises the main steps in a method of manufacturing an actuator component for a droplet ejection head 20 as described herein. FIG. 11*b* depicts an alternative method of manufacture for an actuator component as described herein, where some of the steps have been re-ordered. FIGS. 12*a* to 12*g* depict the main steps; as follows:

Step 300: fixedly attaching one or more strips of piezoelectric material 120 to a substrate 110, as depicted in FIGS. 12*a* and 12*b* (in this instance two strips 120_1 and 120_2). This step may comprise fixedly attaching a larger piece of piezoelectric material to the substrate 110 and then cutting or forming or machining the larger piece so as to form one or more strips of piezoelectric material 120. It may be seen that in the example in FIGS. 12*a* and 12*b* a row of inlet ports 211 and two rows of outlet ports 212 have been formed in the substrate 110. It may be understood that the ports may be formed before the strips of piezoelectric material 120 have been attached to the substrate 110, after the strips of piezoelectric material 120 have been attached, or they may suitably be formed at a later stage in the manufacturing process.

Step 300*a*: optionally, forming chamfers 122 on the upper edges of said one or more strips of piezoelectric material 120, as shown in FIG. 12*b*, so as to form a trapezoidal cross-section. This step is optional, depending on the required cross-sectional shape of the strips of piezoelectric material.

Step 310: forming one or more arrays of fluid chambers 130_1 and 130_2 in the one or more strips of piezoelectric material 120, as shown in FIG. 12*b*, so as to create a plurality of open-ended channels or fluid chambers 131 in said one or more strips of piezoelectric material 120, wherein the fluid chambers 131 are aligned in an array direction 10 along the one or more strips of piezoelectric material 120. Each fluid chamber 131 is formed such that it comprises an open channel in the strip of piezoelectric material 120 with an opening at either end in the fluid chamber extension direction 5 and such that the fluid chambers 131 are also open along their extent on the opposite side to the substrate 110 in the fluid chamber height direction 15.

Any suitable method may be used to form the fluid chambers 131, such as laser cutting, or cutting with a dicing blade or saw, or using a water jet cutter, or any other suitable cutting tool. As an example, dicing blades may be between 3 μm and 160 μm wide. Depending on the required design, the fluid chambers 131 may be formed with any suitable width, W, depending on the dicing blade chosen; for example they may be between 50 μm and 100 μm wide. The height, H, of the fluid chambers 131 may be controlled by altering the path and position of the dicing blade, for example so as to form the fluid chambers 131 to any suitable height H, where a suitable height H may be between 25 μm and 600 μm, preferably between 100 μm and 500 μm, more preferably between 300 μm and 450 μm, still more preferably between 350 μm and 410 μm. For example, a fluid chamber 131 may have a height H of 360 μm, 370 μm, or 380 μm to a tolerance of +/−15 μm. To form the fluid chambers 131 the dicing blade may be lowered towards the substrate 110 to one side of the strips of piezoelectric material and then moved across the strips of piezoelectric material 120 in the fluid chamber extension direction 5 so as to form all of the fluid chamber(s) 131 at a given position in the array direction 10. The dicing blade may then be lifted and returned to its original position, and the actuator component may be incrementally moved in the array direction 10 so that the next row of fluid chamber(s) 131 may be formed.

Step 320: forming electrical tracks and connections (not shown) in a plurality of said fluid chambers 131. This step may be performed using any suitable method. For example, metallic layer(s) may be deposited over the substrate 110, piezoelectric strips 120 and into the array 130 of fluid chambers and then some of the metal layer may be removed to form metal tracks and electrodes (for example using a laser to ablate some of the metal layer). Alternatively, other methods could be used such as using a photoresist or masking to form the tracks and electrodes. Step 320 may, optionally, also comprise depositing one or more coating layers for passivation and/or insulation of said electrical tracks and connections. Alternatively, the coating layer(s) may be formed at a later stage, e.g. at any point after electrodes have been formed.

Figure 12C:
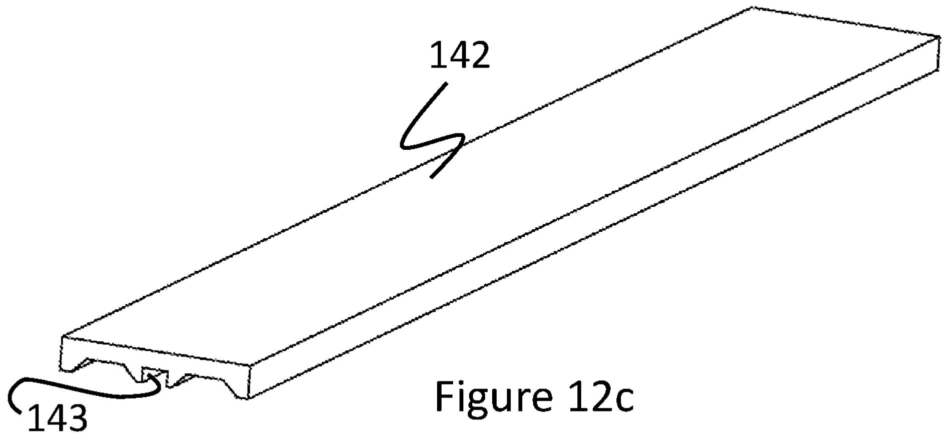
FIG. 12*c* depicts a wafer for attaching to the actuator component of FIG. 12*b;*

Step 330: forming a wafer 142 that is conformal to at least some of said one or more strips of piezoelectric material 120 and at least some of said substrate 110, as shown in FIG. 12*c*, wherein said wafer 142 comprises one or more parts. For example, the wafer 142 may comprise a single layer of material, or be formed from a number of layers of material fixedly attached together. Alternatively it may comprise a number of component parts, for example a number of parts that have been pre-shaped to be conformal to a particular part of the strips of piezoelectric material 120 or the substrate 110 that are then fixedly attached together.

The wafer 142 may be shaped by machining or moulding or any suitable manufacturing technique, or the component parts may be formed and then assembled and then further shaped using any suitable manufacturing technique, such as cutting or grinding or laser ablating. The material of the cover wafer 142 may be the same material as the strips of piezoelectric material, or a different material. The material of the cover wafer 142 may comprise a material that is acoustically the same or similar to the strips of piezoelectric material 120 and/or the substrate 110.

In an alternative method the wafer 142 may comprise a conformable material and the method of manufacture may involve vacuum forming a conformable film to a required shape, either in situ over the actuator component 101-107 or over an external form whereby the film is then cured and, if necessary, further machined or cut to shape and, if formed on an external form, then attached to the actuator component 101-107.

Figure 12D:
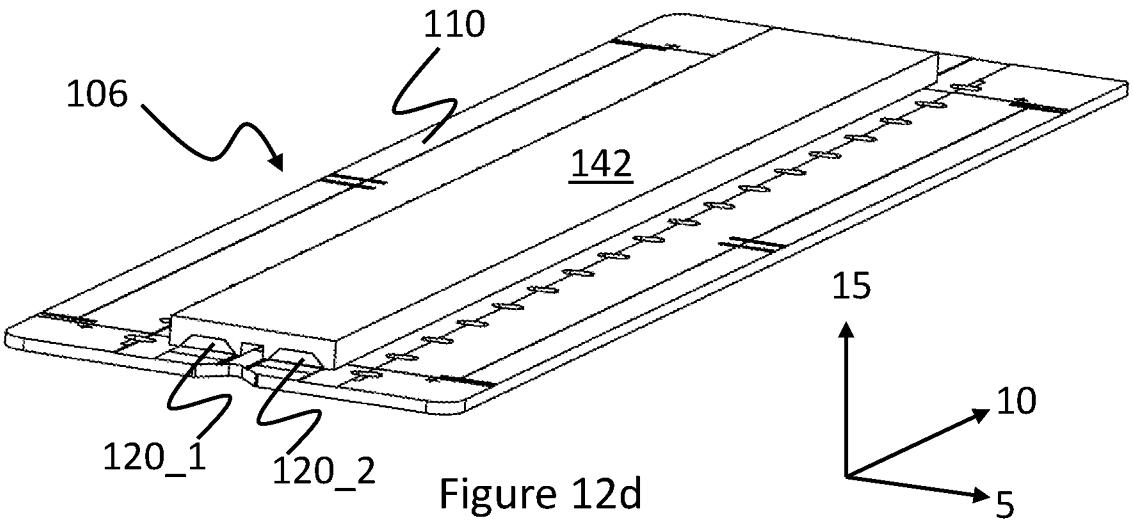
FIG. 12*d* depicts the wafer of FIG. 12*c* attached to the actuator component of FIG. 12*b;*
Figure 12E:
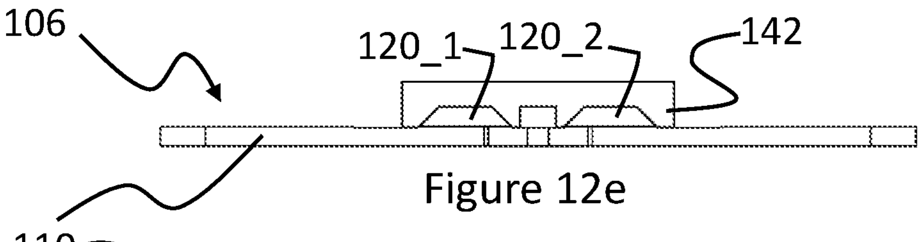
FIG. 12*e* depicts a cross-section of the actuator component of FIG. 12*d;*

Step 340: fixedly attaching at least a part of said wafer 142 to said substrate 110 and at least a part of said wafer 142 to said one or more strips of piezoelectric material 120, as shown in FIG. 12*d*, and in cross-section in FIG. 12*e*. The attachment method may comprise gluing using any suitable adhesive. The gluing method may comprise depositing or 3D printing a glue in appropriate locations. The glue may be curable, e.g. thermal curable glue, or if the cover wafer is formed from a UV transparent material a UV curable glue may be used. Epoxy glues—glues that are curable in a temperature range that doesn't damage or otherwise compromise the PZT performance—may be used; they may for example be curable below 140° C., more preferably below 120° C.

As an alternative to a flowable glue, films of adhesive material may be applied as a layer between the wafer 142 and the strip of piezoelectric material 120 and the substrate 110, and then the film may be cured or otherwise treated to ensure adhesion.

Figure 12F:
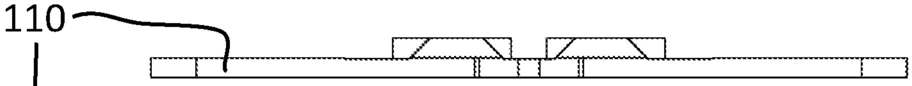
FIG. 12*f* depicts a cross-section of the actuator component of FIG. 12*e* with material removed the wafer to form cover parts on both sides of the strips of piezoelectric material.

Step 350: removing material from said wafer 142 and thereby forming one or more cover parts 140 which are fixedly attached to a face of one of said strips of piezoelectric material 120 and at least a portion of said substrate 110, as shown in FIG. 12*f*. The material may be removed by any suitable method or combination of methods, such as cutting and/or grinding the wafer 142, for example whereby removing material from the wafer 142 comprises grinding or cutting said wafer from the side opposite to that fixedly attached to the substrate 110 so as to form the one or more cover parts 140. In embodiments such as that depicted in FIG. 9*a* the method of manufacture of the actuator component may comprise forming a respective cover part 140 on each side of said one or more strips of piezoelectric material 120.

Figure 12G:
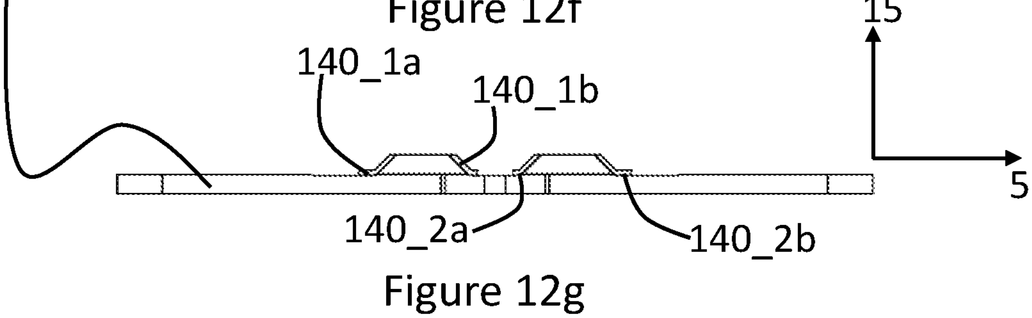
FIG. 12*g* depicts a further cross-section of the actuator component of FIG. 12*f* with a chamfer formed in the cover parts.

Step 350*a*: optionally, shaping the cover parts, for example forming chamfers 122 on the upper edges of some of said one or more cover parts 140, as shown in FIG. 12*g* (or other shapes, as described with reference to FIG. 9*d*—e.g. wherein said shaped profile comprises a chamfer 144, or a concave or convex profile or a stepped profile extending along the length of the cover part in the array direction 10). The chamfers 122 may be formed parallel to the chamfers on the strips of piezoelectric material 120, or inclined at a different angle. They may also be formed where the strips of piezoelectric material 120 have not been chamfered. Chamfers may be desirable in some implementations as it may make it easier to perform the laser track cutting at a later stage in the process. In other implementations the cover parts 140 may be trimmed and/or chamfered so as to form different lengths of openings 141 by altering the position of the chamfer-forming or trimming tool(s) relative to the cover parts 140. For example, where the fluid chambers 131 are elongate in a fluid chamber extension direction 5 which is at an angle to the array direction 10, the length, l, of the openings 141 in the fluid chamber extension direction 5 can be controlled by removing more or less material from the cover parts 141 (or alternatively by using different designs of wafer 142 from which to form the cover parts 141).

Considering FIG. 12*g* further, it can be seen that the cover parts 140 do not extend all the way across the substrate because a channel 143 was formed in the wafer 142 (see FIG. 12*c*); this means that the ports 211 are not covered by the cover part(s) 140. This is by no means essential and in other arrangements the cover parts 140 may be shaped differently so as to comprise a part that additionally covers the region of substrate 110 between the strips of piezoelectric material 120. In this case the ports 211/212 may be formed after the cover parts 140 have been formed, so as to pass through both the substrate 110 and the cover part 140, rather than forming the ports 211/212 when preparing the substrate 110. Alternatively the ports 211/212 may be formed in the substrate 110 as before, and then further holes formed through the relevant section of the cover part 140 to open up the ports 211/212.

Step 360: forming a plurality of openings 141 in said cover parts 140 to form an actuator component as depicted in FIGS. 9*b*-9*d*. The openings 141_1*a*, 141_1*b*, 141_2*a*, 141_2*b* may be formed by any suitable method, such as laser cutting, or cutting with a dicing blade or cutter. Depending on the method used, the width and/or height of the openings 141_1*a*, 141_1*b*, 141_2*a*, to 141_2*b* may be controlled. For example, by using different widths of dicing blades, different widths w of the openings 141_1*a*, 141_1*b*, 141_2*a*, to 141_2*b* can be cut—for example forming openings 141_1*a*, 141_1*b*, 141_2*a*, to 141_2*b* whose width, w, in the array direction 10 is less than or equal to the width, W, of the fluid chambers 131.

Further the depth to which the cut is made can be controlled so as to control the height, h, of the openings 141_1*a*, 141_1*b*, 141_2*a*, to 141_2*b*, wherein the height, h, of the openings 141_1*a*, 141_1*b*, 141_2*a*, 141_2*b* can be controlled to be less than or equal to the height, H, of the fluid chambers 131.

Still further the cross-sectional area Ao of the openings 141_1*a*, 141_1*b*, 141_2*a*, 141_2*b* may be controlled to be less than or equal to the cross-sectional area of the fluid chambers Ac. Still further the length l of the openings 141_1*a*, 141_1*b*, 141_2*a*, 141_2*b* in the fluid chamber extension direction 5 may be controlled to be less than or equal to the length L of the fluid chambers 131. Account may be taken of the location and thicknesses of any coatings c1 . . . cn on the surface(s) of the fluid chambers 131 so as not to damage said coatings. In some arrangements the cut depth of the openings may therefore be controlled so that the openings 141_1*a*, 141_1*b*, 141_2*a*, to 141_2*b* are slightly shallower than the fluid chambers 131, and/or a narrower cutting tool (e.g. cutting blade) may be used to form the openings than that used to form the fluid chambers 131. Forming the openings 141_1*a*, 141_1*b*, 141_2*a*, to 141_2*b* in such a way could be used to prevent damage to any coatings or layers c1 . . . cn already provided to the internal surfaces of the fluid chambers 131.

The control of the manufacturing parameters can be done so as to alter the size of the openings 141_1*a*, 141_1*b*, 141_2*a*, to 141_2*b* at different locations in the array direction 10, for a given design of actuator component 101-107. Alternatively control of manufacturing parameters may be so as to produce different actuator components from the one production line, for example. As an example, cutting blades may be between 30 and 400 μm wide; for example they may be available at any desired width within this range. Thicker blades may also be available, at any desired width, up to, for example, 2.2 mm wide.

As a non-limiting example the fluid chambers 131 may be, for example 75 μm wide, and 65 μm wide after deposition of the metal plating layer c1, and 55 μm wide after deposition of the protective coating or passivation layer c2. A suitable dicing blade or blades may be chosen to cut the openings 141_1*a* to 141_2*b* to the desired width w, where w<55 μm. In another non-limiting example, a 65 μm dicing blade may be chosen to form the openings if the cross-sectional area Ac of the fluid chambers 131 is 65 μm after deposition of the metal plating layer c1. The openings 141_1*a* to 141_2*b* may be cut and then the coating layer(s) c2 . . . cn (for example) may be deposited at a later stage, after the openings 141_1*a* to 141_2*b* have been formed, so that both fluid chambers 131 and openings 141_1*a* to 141_2*b* are narrowed by the thickness of any protective coating layer(s) c2 . . . cn that are applied.

Alternatively, other blade thicknesses may be chosen as suitable for the design so as to form restrictor designs where Ao<Ac, so as to form an actuator component 101 wherein the width, w, of the openings is less than the width, W, of the fluid chambers 131 (w<W). The plurality of openings 141_1*a* to 141_2*b* may, for example, be formed by lowering a dicing blade towards the cover parts 140_1*a* to 140_2 and cutting a path through the cover part(s) 140_1*a* to 140_2*b*, so as to form a plurality of open-ended channels, the openings 141_1*a* to 141_2*b*. As part of the cutting process, the dicing blade may also pass through the fluid chambers 131, but without affecting them.

It should be understood that openings 141_1*a* to 141_2*b* may also be formed using, for example, techniques such as laser ablation, which may be used for forming narrower openings. It may also be understood that the width w of the openings 141 may be proportionate to the width W of the fluid chambers 131, therefore where the fluid chambers are wider than 75 μm, the openings 141 may be made wider accordingly. As for the formation of the fluid chambers 131, the height, h, of the openings 141_1*a* to 141_2*b* may be selectively altered by, for example, altering the vertical position of the dicing blade relative to the substrate 110.

It should be understood that, depending on the design of actuator component 101, 102, 103, 104, 105, 106 (or variants thereof) being manufactured, the number and location of the openings can be controlled. For example, where there is a buffer region 150 and/or where every other fluid chamber 131 is open in at least the main region, so as to form an ALA design, the method of forming a plurality of openings may comprise forming fewer openings 141 than there are fluid chambers 131. Further, where the actuator component enables ALA, the method of manufacturing the actuator component may comprise forming at least one opening for every other fluid chamber 131 over a substantial portion of the array 130 of fluid chambers. Alternatively, where the actuator component does not enable ALA, the method of manufacturing the actuator component may comprise forming at least one opening 141 per fluid chamber over a substantial portion of the array 130 of fluid chambers, for example, where the substantial portion may comprise at least the main region 160.

Further, when manufacturing an actuator component, depending on the type of actuator component that is required, the plurality of openings 141 may be formed in the cover part 140 by a method that involves choosing the number of openings 141 and the width, w, and/or length, l, and/or height, h, of the openings 141 and forming the cover parts 140 from the wafer 142 so as to meet the chosen requirements. For example, the method of manufacturing the actuator component may involve choosing:

- an ALA design by forming at least one opening 141 for every other fluid chamber 131 over substantially all of the array 130 of fluid chambers, and/or
- a restrictor design by forming openings 141 wherein over substantially all of the array 130 of fluid chambers the width, w, of the openings 141 is less than the width, W, of the fluid chambers 131 and/or the height, h, of the openings 141 is less than the height, H, of the fluid chambers 131 and/or the cross-sectional area of the openings is less than the cross-sectional area of the fluid chambers.

Further, where the actuator component comprises cover parts 141*a*, 141*b* on both sides of the strip(s) of piezoelectric material, the method of manufacturing the actuator component may comprise forming openings 141 of different widths, wa, wb, and/or of different heights, ha, hb, and/or of different cross-sectional areas on each side of each fluid chamber 131 over a substantial portion of the array of fluid chambers. For example, the openings 141 adjacent to an inlet manifold channel 201 on one side of the array 130 of fluid chambers may be different to those adjacent to an outlet manifold channel 202 on the other side of the array 130 of fluid chambers in the fluid chamber extension direction 5.

Still further, where the openings comprise sub-openings, the method may comprise forming a number of sub-openings for each opening. In addition, where the design is an ALA design, and/or comprises one or more buffer regions 150 the method may comprise forming pillars and/or a fill in certain fluid chambers 131.

It may be understood that once the above-described manufacturing steps have been performed, further manufacturing steps may also be performed, such that the method may further comprise fixedly attaching a nozzle wafer 220 to the actuator component 101, 102, 103, 104, 105, 106, 107 so as to fluidically seal said manifold channels 201, 202 and said openings 141 and said array of fluid chambers 131. The nozzle wafer 220 may then have nozzles 221 formed therein, for example by using laser ablation to open up nozzles 221 connecting to the fluid chambers 131, but it should be understood that any suitable method of forming the nozzles 221 may be utilised; and that they may be formed before or after attaching the nozzle wafer 220 to the actuator component 101, 102, 103, 104, 105, 106, 107, 108. Further manufacturing steps may comprise deposition of protective coating layer(s), for example using vapour deposition methods such as chemical vapour deposition (CVD) or physical vapour deposition (PVD) or a liquid coating such as an electrophoretic coating, so as to coat the internal surfaces of the actuator component 101, 102, 103, 104, 105, 106, 107, 108 with a protective coating layer c or layers ci-n.

Further steps may comprise manufacturing and/or assembling a droplet ejection head 20 comprising one or more actuator components 101, 102, 103, 104, 105, 106, 107, 108 as described herein, where the actuator components 101, 102, 103, 104, 105, 106, 107, 108 may be manufactured according to any of the appropriate manufacturing steps described herein. It should be understood that manufacturing a droplet ejection head 20 may comprise fluidically connecting an actuator component or components 101, 102, 103, 104, 105, 106, 107, 108 to further parts, such as a fluidic supply system so that the inlet port(s) 211 and (where present) the outlet ports 212 are fluidically connected to inlet(s) and outlet(s) respectively on the outer surface of the droplet ejection head 20, and may also comprise assembling together further parts, such as electronics components, cover parts etc., so as to form a droplet ejection head 20.

In an alternative arrangement the fluid chambers 131 may be formed with different widths so as to optimise use of space. For example, an ALA design as described herein may comprise two widths of fluid chamber, W1 and W2, in the main region 160. In such an arrangement, for example, the open fluid chambers 131*c* may have a width W1 and the dummy (dry) fluid chambers 131*d* may have a width W2, where W2<W1; for example W2 may be half of W1 (W2=W1/2). Cutting narrower dummy fluid chambers 131*d* would alter the pitch between the firing and non-firing fluid chambers and would allow greater print resolution for a given size of droplet ejection head.

It should be understood that the process step for manufacturing the fluid chambers, where there are different widths of fluid chambers 131*c*, 131*d*, may be adjusted appropriately, for example by changing step 310 into a two-step process and forming one or more arrays 130 of fluid chambers so as to create a plurality of open-ended channels or fluid chambers 131*c* of width W1 and a plurality of open-ended fluid chambers 131*d* of width W2 in said one or more strips of piezoelectric material 120, wherein the fluid chambers 131*c*, 131*d* are aligned in an array direction 10 along the one or more strips of piezoelectric material 120. Such a step might, for example, involve using dicing blades of different widths so as to form alternate fluid chambers 131*c*, 131*d* of widths W1 and W2 respectively along the strip(s) of piezoelectric material. For example a first blade of width W1 may be used to cut all the fluid chambers 131*c* of width W1, and then a second blade of width W2 may be used to cut all the fluid chambers 131*d* of width W2.

Alternatively, such a fluid chamber formation step might involve aligning two dicing blades of different widths W1 and W2 and cutting two fluid chambers 131*c*, 131*d* in a single cutting pass, then adjusting the positions of the blades in the array direction 10 and cutting the next pair of fluid chambers 131*c*, 131*d*. The end result of either method will be that the array of fluid chambers has fluid chambers 131*c*, 131*d* of alternate widths W1, W2 in the array direction 10. The openings 141 are then formed at their desired locations, so as to align with the fluid chambers 131*c*, using a dicing blade of suitable width, w, where w<W1.

Turning now to FIG. 11*b*, this depicts a series of process steps that are very similar to those of FIG. 11*a*, except that step 320 has been moved to after step 360, illustrating that the deposition of the metal layers and the formation of the tracks and connections is being done at a later step in the process, after attaching the cover parts 140 and forming the openings 141.

Figure 13A:
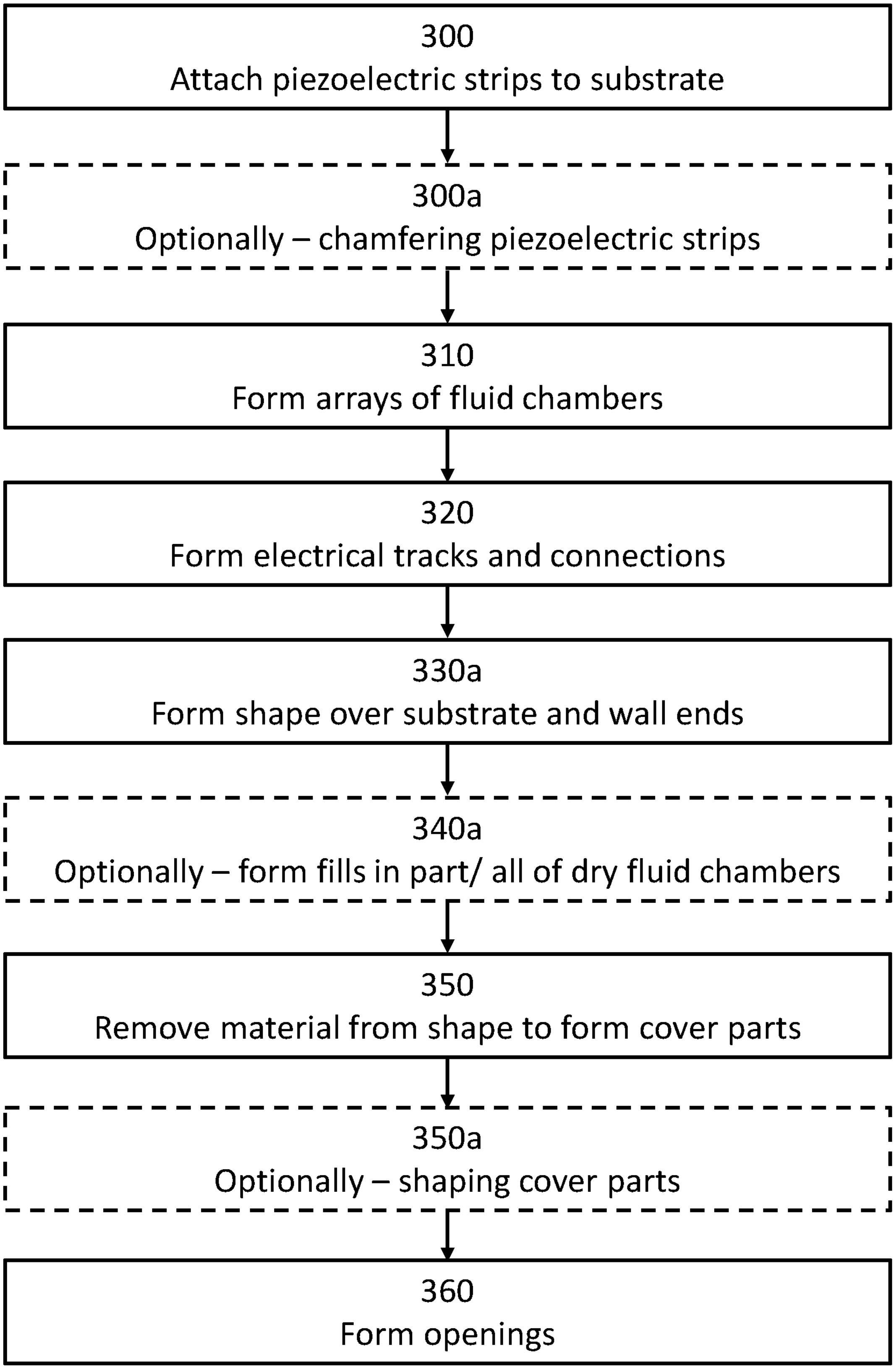
FIG. 13*a* is a flow chart showing steps in an alternative method of manufacture of an actuator component.
Figure 13B:
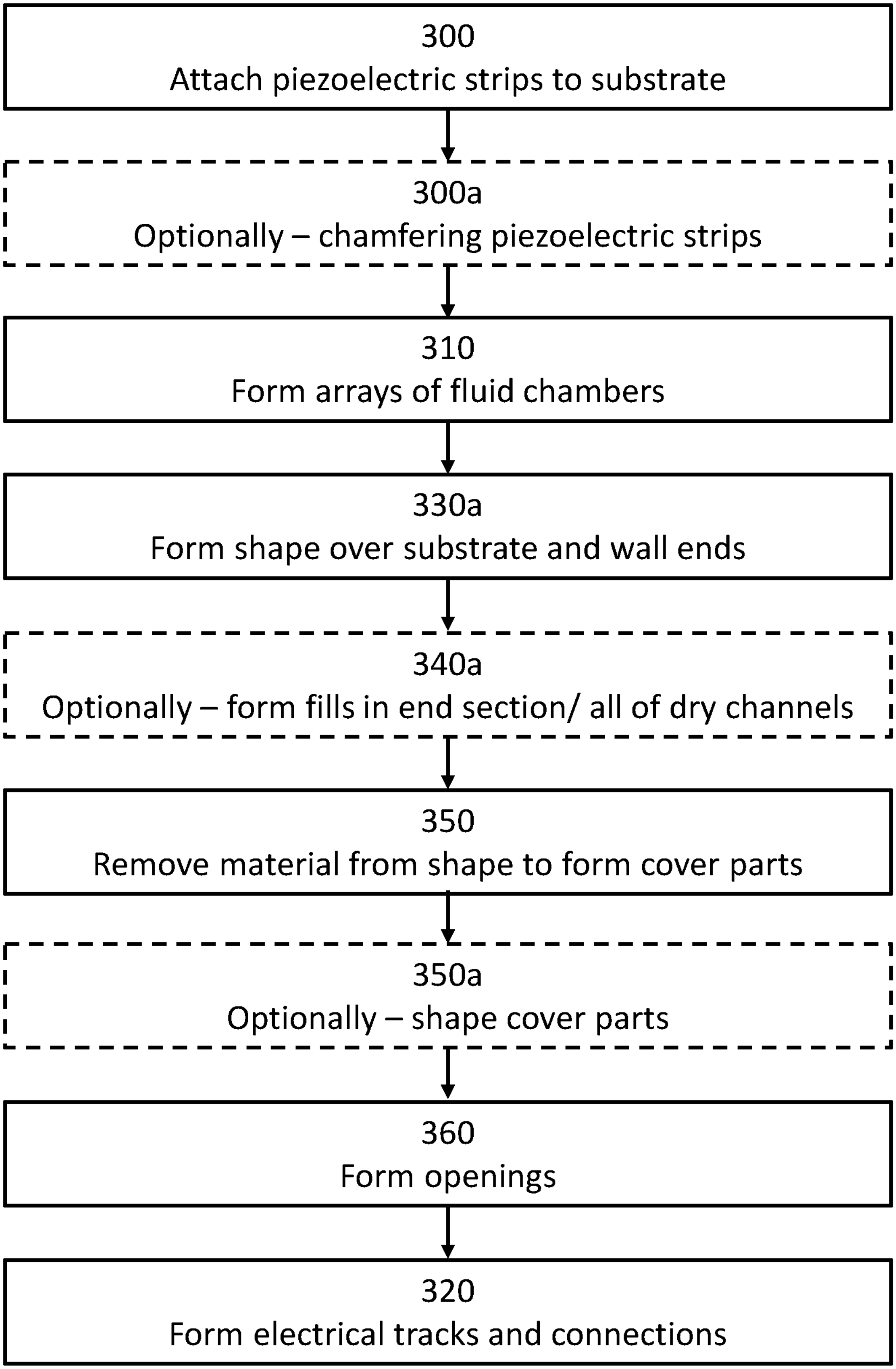
FIG. 13*b* is an alternative flow chart to that of FIG. 13*a* depicting steps in the manufacture of an actuator component.

FIGS. 13*a* and 13*b* describe a manufacturing process for an actuator component where the cover parts are formed from an epoxy film or a flowable material such as glue, or any other suitable material, as depicted with reference to FIGS. 10*a* to 10*d*. The steps described in FIG. 13*a* are similar to those described above with reference to FIG. 11*a*, except that steps 330, 340 and 350 have been replaced with steps 330*a*, 340*a* and 350*a*, so that once step 320 (form electrical tracks and connections) has been completed the process moves to:

Step 330*a*: Form shape over substrate and wall ends. This may involve depositing a layer or layer(s) of flowable material, such as glue, up the sides of the strip of piezoelectric material so as to form the cover part 140, for example as shown in FIG. 10*b* where there are three layers, i-iii. A suitable method may involve using a droplet ejection head or a 3D printer, to dispense (e.g. jet) a flowable material such as glue and said material is then cured in situ, e.g. by UV curing, or curing with time, or with thermal energy or by mixing two materials that react together to harden. In some arrangements the glue may be planarised or otherwise abraded or treated after hardening so as to provide a smooth surface.

As a non-limiting example a suitable method may involve using a device such as a Nordson Asymtek to dispense glue, such as Delo OB787 adhesive, at 30° C. and then heat it to 50° C. to allow the layers to flow and spread out evenly and provide a protective layer over a larger region of the electrical tracks and connections. This step may optionally be followed by, for example, a UV cure to fix the glue. In some arrangements the adhesive may be used to passivate (e.g. protect from electrical corrosion) all of the electrodes and as such may extend over the entire wetted surface (e.g. surfaces that will be exposed to fluids such as inks when the device is in operation).

Optionally step 340*a* may be implemented where fills are formed in some or all of any fluid chambers 131 that are to be dummy or dry fluid chambers 131*d*. Such fills may comprise pillars 148_*a*, 148_*b* at the ends of the fluid chambers 131*d* (as in FIG. 10*c*) with an air gap 249 in the remainder of the fluid chamber 131*d*, or they may be filled entirely with a fill 149 (as in FIG. 10*d*). Still further the air gap 249 may be replaced with a fill 249 with chosen properties, where said fill 249 may have different electrical or mechanical properties to the pillars 148_*a*, 148_*b*. It should be understood that the pillars and/or the fills may be deposited as a single layer or built up as a series of layers. Additionally, where several layers are used, the layers may be cured before the next layer is deposited, for example using UV or thermal curing methods. Additionally, or alternatively, the layers may be cured after all of them have been laid down. A combination of more than one type of cure may be used in some instances.

Step 350, to remove material from the shape to form the cover parts, is similar to that of step 350 described above. For example, it may involve grinding or cutting the shape back to form cover parts 140 that are level with the top of the strip of piezoelectric material 120. Optionally step 350*a* to shape the cover parts may involve cutting one or more of the outer faces of the cover parts so as to provide a shaped surface, such as steps, or concave or convex surfaces as described previously with reference to FIG. 9*d*.

Step 360: forming a plurality of openings 141 in said cover parts 140 to form an actuator component as described herein. This process may comprise e.g., sawing or cutting to form the openings. Alternatively techniques such as laser ablation may be used.

So put together the steps can be summarised as a method of manufacturing an actuator component for a droplet ejection head, wherein the method comprises the following steps:

Step 300: fixedly attaching one or more strips of piezoelectric material to a substrate;

Step 300*a*: optionally, chamfering the upper edges of said one or more strips of piezoelectric material, e.g. so as to form a trapezoidal cross-section;

Step 310: forming one or more arrays of fluid chambers in said one or more strips of piezoelectric material;

Step 320: optionally, forming electrical tracks and connections;

Step 330*a*: forming a shape over said substrate and at least a part of said one or more strips of piezoelectric material;

Step 340*a*: optionally forming fills in parts/all of selected ones of said fluid chambers;

Step 350: removing material from said shape and thereby forming one or more cover parts which are fixedly attached to a face of one of said strips of piezoelectric material and/or to at least a portion of said substrate;

Step 350*a*: optionally shaping an outer surface or surfaces of the cover parts; and Step 360: selectively forming a plurality of openings in said cover parts so as to enable fluid to be supplied to selected ones of said fluid chambers through said openings.

Turning now to FIG. 13*b*, this depicts a series of process steps that are very similar to those of FIG. 13*a*, except that step 320 has been moved to after step 360, illustrating that the deposition of the metal layers and the formation of the tracks and connections is being done at a later step in the process, after attaching the cover parts 140 and forming the openings 141.

It may be understood that any of the implementations described herein may be combined with any of the other implementations, as appropriate. For example, an actuator component with restrictors but without ALA, as described with reference to FIGS. 1-6 and 8, may comprise a buffer region or regions 150 at either end of the one or more piezoelectric strips 120 in the array direction 10, such that the actuator component comprises at least one opening 141 per fluid chamber 131 over a substantial portion of the array 130 of fluid chambers (for example in the main region 160). Other combinations may also be implemented.

It may further be understood that the cover parts do not need to be made from a solid material, but could instead be made from a flexible or highly viscous material which forms a barrier that can be shaped accordingly or a viscoelastic material, such as rubber, and equivalents.

It may be understood that the embodiments described herein may be used with both monolithic and chevron designs of actuator component. It may further be understood that layer(s) to form electrical tracks and coating layer(s) as described with reference to FIG. 2*a* to FIG. 2*d* may be implemented in any of the embodiments described herein.

Alternatively electrical tracks may be positioned at any other suitable location so as to enable chosen fluid chambers to receive electrical signals and be driven so as to eject droplets of fluid when desired. Coating layer(s) for electrical passivation and/or chemical protection and the like may also be applied at any suitable stage during the manufacturing process and in any suitable locations so as to perform their desired function(s).

The invention claimed is:

1. An actuator component for a droplet ejection head, wherein the actuator component comprising a substrate and a strip of piezoelectric material fixedly attached to the substrate;

wherein the strip of piezoelectric material comprises a layer of piezoelectric material, and an array of fluid chambers defined within the strip of piezoelectric material and extending in an array direction;

wherein each of said fluid chambers forms an open channel defined on at least three sides by and in the strip of piezoelectric material, the channel being open in a fluid chamber height direction and being open at both ends in a fluid chamber extension direction;

wherein the actuator component further comprises a cover part;

wherein the cover part extends in the array direction and is fixedly attached to a side face of the strip of piezoelectric material and to a portion of the substrate;

wherein the cover part comprises a plurality of openings so as to enable fluid to be supplied to selected fluid chambers through the openings, and wherein the fluid chambers and the plurality of openings have a width in the array direction and wherein the width of the openings is less than or equal to the width of the fluid chambers.

2. The actuator component according to claim 1, further comprising electrical tracks and connections;

wherein at least a portion of the electrical tracks and connections are located between the substrate and the cover part, and/or between the strip of piezoelectric material and the cover part.

3. The actuator component according to claim 1, further comprising a cover part on each side of the strip of piezoelectric material, and wherein each of the cover parts comprises a plurality of openings.

4. The actuator component according to claim 1, wherein the fluid chambers and the plurality of openings have a height in a fluid chamber height direction, and wherein the height of the openings is less than or equal to the height of the fluid chambers.

5. The actuator component according to claim 1, wherein the fluid chambers and the plurality of openings have a cross sectional area in the array direction, and wherein the cross sectional area of the openings is less than or equal to the cross sectional area of the fluid chambers.

6. The actuator component according to claim 1, wherein the openings in the cover part on each side of the strip of piezoelectric material have the same length, the same width, the same height, and the same cross-sectional area, or combinations thereof.

7. The actuator component according to claim 1, wherein the cover part comprises at least one opening for every other fluid chamber.

8. The actuator component according to claim 1, wherein the cover part comprises at least one opening per fluid chamber.

9. The actuator component according to claim 1, wherein the array of fluid chambers comprises a main region and a buffer region at one end of the array of fluid chambers, wherein the openings and/or the fluid chambers in the buffer region differ from those in the main region.

10. The actuator component according to claim 1, further comprising a port, wherein the width of the openings increases with increasing distance from the port.

11. The actuator component according to claim 1, wherein the cover part comprises an outer face, the outer face comprising a shaped profile.

12. A droplet ejection head comprising an actuator component according to claim 1.

13. A method of manufacturing an actuator component for a droplet ejection head, the method comprising the steps of:

fixedly attaching a strip of piezoelectric material to a substrate;

forming an array of fluid chambers in the strip of piezoelectric material and extending in an array direction, wherein each of said fluid chambers forms an open channel defined on three sides by and in the strip of piezoelectric material, the channel being open in a fluid chamber height direction and being open at both ends in a fluid chamber extension direction;

forming a wafer that is conformal to the strip of piezoelectric material and the substrate;

fixedly attaching a first part of the wafer to the substrate and a second part of the wafer to the strip of piezoelectric material;

removing material from the wafer and thereby forming a cover part which is fixedly attached to a face of the strip of piezoelectric material and to a portion of the substrate; and selectively forming a plurality of openings in the cover part so as to enable fluid to be supplied to selected fluid chambers through the openings; and wherein the fluid chambers and the plurality of openings have a width in the array direction and wherein the width of the openings is less than or equal to the width of the fluid chambers.

14. The method according to claim 13, further comprising forming a cover part on each side of the strip of piezoelectric material.

15. The method according to claim 13, wherein selectively forming the plurality of openings in the cover part involves choosing at least one from the group of:

the number of openings, the width of the openings, the length of the openings, the height of the openings, and the cross-sectional area of the openings, depending on the type of actuator component that is required.

16. The method according to claim 15, wherein the actuator component that is formed has at least one of:

an Alternate Line Active design by selectively forming an opening for every other fluid chamber over substantially all of the array of fluid chambers; and/or a restrictor design by selectively forming openings wherein over substantially all of the array of fluid chambers at least one of the group of:

the width of the openings, the height of the openings, the cross-sectional area of the openings, and the length of the openings is less than the corresponding dimension of the fluid chambers.

17. A method of manufacturing an actuator component for a droplet ejection head, the method comprising the steps of:

fixedly attaching a strip of piezoelectric material to a substrate;

forming an array of fluid chambers in the strip of piezoelectric material and extending in an array direction, wherein each of said fluid chambers forms an open channel defined on three sides by and in the strip of piezoelectric material, the channel being open in a fluid chamber height direction and open at both ends in a fluid chamber extension direction;

forming a shape over the substrate and a part of the strip of piezoelectric material;

removing material from the shape and thereby forming a cover part which is fixedly attached to a face of the strip of piezoelectric material and/or to a portion of the substrate; and selectively forming a plurality of openings in the cover part so as to enable fluid to be supplied to selected fluid chambers through the openings; and wherein the fluid chambers and the plurality of openings have a width in the array direction and wherein the width of the openings is less than or equal to the width of the fluid chambers.

18. The method according to claim 17, further comprising forming a respective cover part on each side of the strip of piezoelectric material.

19. The method according to claim 17, wherein selectively forming the plurality of openings in the cover part comprises choosing at least one of:

an Alternate Line Active design by selectively forming an opening for every other fluid chamber over substantially all of the array of fluid chambers; and/or a restrictor design by selectively forming openings wherein over substantially all of the array of fluid chambers at least one of the group of:

the width of the openings, the height of the openings, the cross-sectional area of the openings, and the length of the openings is less than the corresponding dimension of the fluid chambers.

* * * * *